US011232526B2

(12) United States Patent
King et al.

(10) Patent No.: US 11,232,526 B2
(45) Date of Patent: Jan. 25, 2022

(54) CENTRALIZED GOVERNANCE REGULATORY COMPLIANCE (C-GRC) SYSTEM

(71) Applicant: iUNU, Inc., Seattle, WA (US)

(72) Inventors: Matthew Charles King, Seattle, WA (US); Adam Greenberg, Seattle, WA (US)

(73) Assignee: iUNU, Inc., Seattle, WA (US)

( * ) Notice: Subject to any disclaimer, the term of this patent is extended or adjusted under 35 U.S.C. 154(b) by 269 days.

(21) Appl. No.: 16/428,911

(22) Filed: May 31, 2019

(65) Prior Publication Data

US 2020/0380616 A1    Dec. 3, 2020

(51) Int. Cl.
*G06Q 50/00* (2012.01)
*G06Q 50/02* (2012.01)
(Continued)

(52) U.S. Cl.
CPC ........... *G06Q 50/02* (2013.01); *G06Q 30/018* (2013.01); *G06Q 30/0185* (2013.01); *H04L 9/14* (2013.01);
(Continued)

(58) Field of Classification Search
CPC .. G06Q 50/02; G06Q 30/018; G06Q 30/0185; G06Q 2220/00; H04L 9/14; H04L 2209/56; G06K 7/10297; G06K 7/1417
(Continued)

(56) References Cited

U.S. PATENT DOCUMENTS 8,489,437 B1    7/2013 Dlott et al.
9,202,252 B1 *  12/2015 Smith .................... G06Q 50/06
(Continued)

FOREIGN PATENT DOCUMENTS

CN    108182482 A    6/2018
CN    109191003 A    1/2019
(Continued)

OTHER PUBLICATIONS

Figureau et al. "Policy instruments for decentralized management of agricultural groundwater abstraction: a participatory evaluation." In: Ecological Economics. Feb. 11, 2016(Feb. 11, 2016) Retrieved on Jul. 23, 2020 (Jul. 23, 2020) from entire document.
(Continued)

*Primary Examiner* — Daniel A Hess
(74) *Attorney, Agent, or Firm* — Han Santos, PLLC

(57) ABSTRACT

The present disclosure describes techniques that facilitate a Governance Regulatory Compliance (C-GRC) controller that is configured to dynamically monitor and collate data associated with an agricultural operation for demonstrating compliance with an agricultural compliance plan. The C-GRC controller may act as a centralized server that dynamically monitors the cycle of agricultural activities for an agricultural product and in doing so, automates the governance of an agricultural compliance plan across a plurality of entities that are each responsible for one or more agricultural activities. The C-GRC controller may detect independent interactions conducted between a complying entity and a participating entity. These interactions may be intended to gather information relating to compliance of a pending task. In doing so, the C-GRC controller may update an agricultural compliance plan accordingly. The C-GRC controller may dynamically advance progress through an agricultural compliance plan or dynamically regress progress based on a complying entity retracting compliance.

20 Claims, 14 Drawing Sheets

(51) Int. Cl.
  *G06Q 30/00* (2012.01)
  *H04L 9/14* (2006.01)
  *G06K 7/10* (2006.01)
  *G06K 7/14* (2006.01)

(52) U.S. Cl.
  CPC ....... *G06K 7/10297* (2013.01); *G06K 7/1417* (2013.01); *G06Q 2220/00* (2013.01); *H04L 2209/56* (2013.01)

(58) Field of Classification Search
  USPC .......................................................... 705/318
  See application file for complete search history.

(56) References Cited

U.S. PATENT DOCUMENTS

| | | | |
|---|---|---|---|
| 10,491,608 | B1 | 11/2019 | Tatge et al. |
| 2003/0182260 | A1* | 9/2003 | Pickett ................... G06Q 10/06 |
| 2005/0228688 | A1 | 10/2005 | Visser et al. |
| 2012/0310700 | A1 | 12/2012 | Kurtz et al. |
| 2013/0185104 | A1* | 7/2013 | Klavins ................ G06Q 10/063 705/7.12 |
| 2018/0322426 | A1 | 11/2018 | Schmaltzx et al. |
| 2019/0090432 | A1* | 3/2019 | Duquette ................ G06Q 10/04 |
| 2020/0027096 | A1* | 1/2020 | Cooner .................... H04L 67/12 |
| 2020/0053957 | A1* | 2/2020 | Rabby .............. G06Q 10/06311 |

FOREIGN PATENT DOCUMENTS

| | | |
|---|---|---|
| KR | 101936317 B1 | 4/2019 |
| WO | 2011115983 A1 | 9/2011 |

OTHER PUBLICATIONS

International Patent Application No. PCT/US2020/035419, Search Report dated Aug. 7, 2020, 10 pages.

Ohkubo, Miyako et al. "Cryptographic Approach to 'Privacy-Friendly' Tags." RFID Privacy Workshop. Cambridge, MA. Nov. 15, 2003, 9 pages.

International Patent Application No. PCT/US2021/023304, Search Report dated Jul. 12, 2021, 4 pages.

International Patent Application No. PCT/US2021/023304, Written Opinion dated Jul. 12, 2021, 5 pages.

* cited by examiner

| SCHEDULE | DESCRIPTION | INTERACTING ENTITIES | DEPENDENCIES | DATA INTEGRATION | COMPLIANCE STATUS |
|---|---|---|---|---|---|
| 1 | SEED MANAGEMENT | SUPPLIER(C) WAREHOUSE(P) ... AUDITOR(C) | - | YES | YES |
| 2 | PLANT GROWTH | GROWER(C) SUPPLIER(P) ... AUDITOR(C) | SCHEDULE 2 | ACTIVE | ACTIVE |
| 3 | PLANT HARVEST | GROWER(C) ... AUDITOR (C) | SCHEDULE 3 | | PENDING |
| ... | ... | | | ... | ... |
| N | SHIPMENT | GROWER (P) SHIPMENT CO (C) ... AUDITOR (C) | SCHEDULE 3, N-1 | | PENDING |

AGRICULTURAL COMPLIANCE PLAN
602

FIG. 6A

| Task | Entities | Schedule: Seed Management 604 Description | Dependency | Compliance Status |
|---|---|---|---|---|
| 1 | Grower (C) | Visual Inventory Inspection | - | Yes |
| 2 | Grower (C) Supplier (P) | Capture Inventory Code | 1 | Active |
| 3 | Grower (C) | Monitor water conditions (i.e. storage, treatment, listeria swab etc.) | 2 | Pending |
| 4 | Auditor (C) | Agricultural Safety Audit Letter of Guarantee | - | Active |
| ... | ... | ... | ... | ... |
| N | Grower (C) | Monitor facility environmental conditions | - | Pending |

FIG. 6B

TASK: VISUAL INVENTORY INSPECTION (SCHEDULE 1)
606

| ACTION | ACTION DESCRIPTION | INVENTORY | DATA INTEGRATION | COMPLIANCE STATUS |
|---|---|---|---|---|
| 1 | VISUAL INSPECTION | SEEDS | YES | YES |
|  |  | TRAYS | ACTIVE | ACTIVE |
| ... | ... | ... | ... | ... |
|  |  | RAFTS | - | INACTIVE |
| 2 | AUTOMATED INSPECTION | MEDIA | - | INACTIVE |
|  |  | FERTILIZER | ACTIVE | ACTIVE |
| ... | ... | ... | ... | ... |
|  |  | PESTICIDES | - | INACTIVE |

FIG. 6C

CENTRALIZED GOVERNANCE REGULATORY COMPLIANCE (C-GRC) SYSTEM

BACKGROUND

Agricultural safety is an imperative element of an agricultural operation. Agricultural safety control requirements are typically developed to protect plant-based products at each segment of an agricultural operation. From the germination of crop seeds through the delivery of plant-based products to retail outlets, each segment of an agricultural operation is governed by requirements that protect an agricultural product from contamination or unsafe conditions that could compromise agricultural quality.

Agricultural safety control requirements are typically developed by collecting data within each segment of an agricultural operation and performing a hazard analysis and/or risk assessment. In this way, an agricultural compliance plan can be developed with the knowledge of what segments require oversight and control. Historically, agricultural safety control requirements are collected in real-time by persons verifying or carrying out discrete tasks of an agricultural compliance plan. An establishment tasked with oversight, control, or performance of a segment of an agricultural operation, may need to demonstrate that proper agricultural compliance plan procedures were followed while the agricultural operation was under their control. Establishment personnel may manually gather and record relevant data that show compliance with the agricultural compliance plan.

However, as technology streamlines agricultural operations, making each segment of an agricultural operation less dependent on human interactions, there remains a need for agricultural safety controls to evolve in such a way that each segment of an agricultural operation can be monitored, and data collated, to demonstrate compliance with agricultural safety control requirements.

BRIEF DESCRIPTION OF THE DRAWINGS

The detailed description is set forth with reference to the accompanying figures. In the figures, the left-most digit(s) of a reference number identifies the figure in which the reference number first appears. The use of the same reference numbers in different figures indicates similar or identical items or features.

FIGS. 6A, 6B, and 6C illustrate exemplary embodiments of an agricultural compliance plan. FIG. 6A illustrates an exemplary compliance plan that includes a plurality of schedules.

FIG. 6B illustrates an exemplary schedule of the compliance plan that includes a plurality of tasks. FIG. 6C illustrates an exemplary task that includes a plurality of actions.

DETAILED DESCRIPTION

Figure 1:
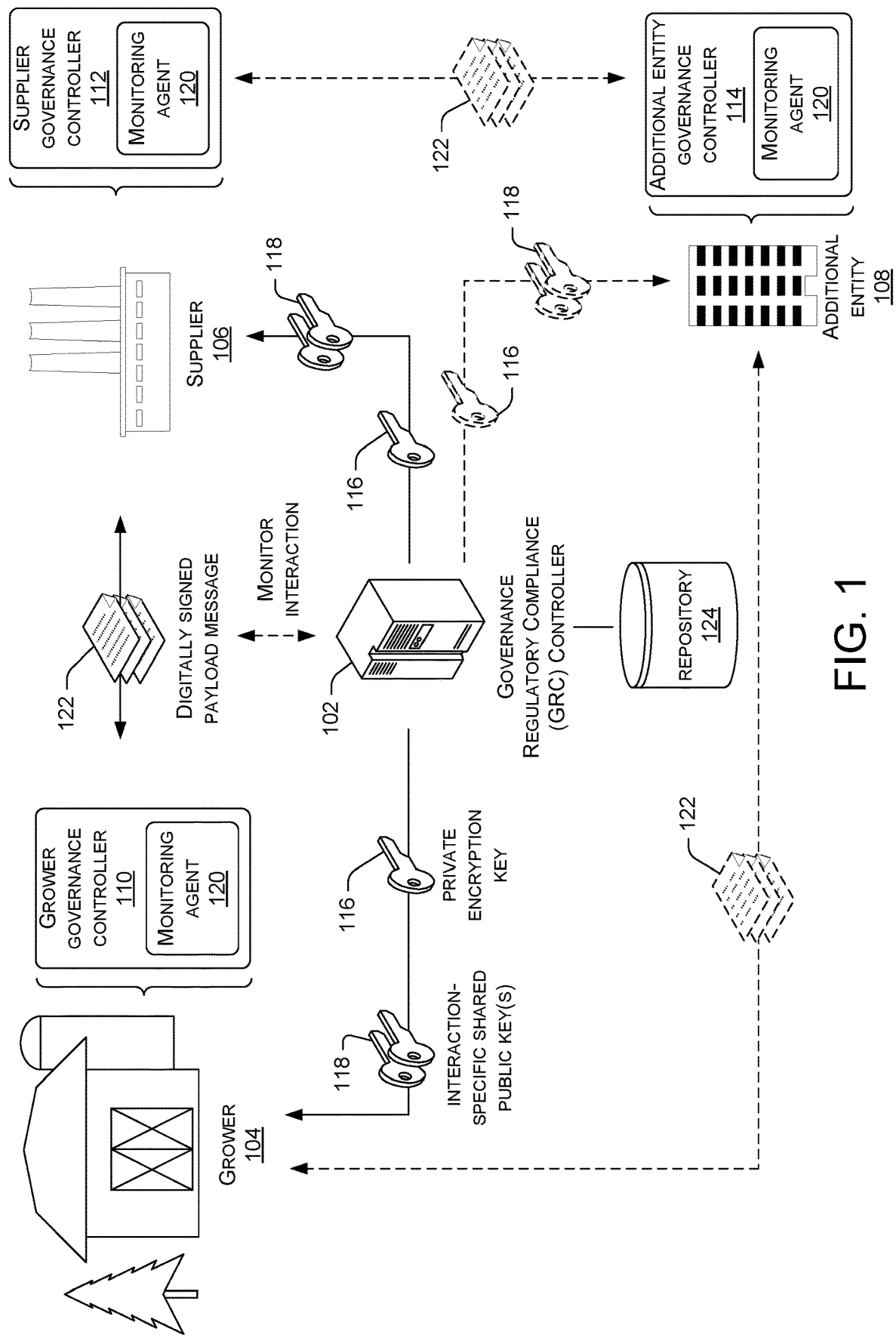
FIG. 1 illustrates an exemplary computing environment for a Governance Regulatory Compliance (C-GRC) controller.

This disclosure describes a Centralized Governance Regulatory Compliance (C-GRC) controller that is configured to dynamically monitor and collate data associated with an agricultural operation for demonstrating compliance with an agricultural compliance plan. The C-GRC controller may act as a centralized server that dynamically monitors the cycle of agricultural activities for an agricultural product and in doing so, automates the governance of an agricultural compliance plan across a plurality of entities that are each responsible for one or more agricultural activities.

The C-GRC controller can benefit agricultural operations by providing a granular record of activities that take place during an agricultural cycle. An auditor or interested party may use the record of activities to verify a chain of custody associated with an agricultural product delivered to the marketplace. In some examples, the chain of custody may be used to determine the origin of a defect found in an agricultural product that made its way into the marketplace.

In one example, the C-GRC controller may establish an agricultural compliance plan that monitors an agricultural operation through various agricultural cycles, such as seed management, plant growth, plant harvest, and shipment to the marketplace. In each agricultural cycle, individual schedules may be developed to monitor the integrity and health of the agricultural operation during a specific agricultural cycle. In a non-limiting example, seed management may include a plurality of processes that monitor and nurture the initial development of a plant from a seed, cutting, or tissue culture. The term "seed" refers to a plant's unit of reproduction that develops into another such plant. The term "cutting" refers to pieces of a plant that are intentionally used to create clones of the parent plant. The term "tissue culture" refers to the growth of plant tissue or cells in an artificial medium that is separate from the parent plant. Each of these processes, collectively, enable the initial development of the plant and thus are within the scope of seed management, as described herein.

In some example, the individual schedules of an agricultural compliance plan may be based on governmental and/or non-governmental safety rules and industry best practices. For example, agricultural safety rules may establish science-based minimum standards for safe growing, harvesting, packaging, and storage of agricultural products grown and/or developed for human use and/or consumption. These agricultural safety rules may set science-based criteria to test product quality and safety at each agricultural cycle. By incorporating the agricultural safety rules within an agricultural compliance plan, the progress of an agricultural operation can be monitored and assessed against each agricultural safety rule and throughout each agricultural cycle.

In various examples, the agricultural compliance plan may include a list of tasks for each schedule that requires completion for the schedule to be deemed, compliant. For example, a "seed management schedule" may include a task to visually inspect inventory, capture inventory code, monitor water conditions, and/or so forth. In some cases, tasks may be performed concurrently. In other examples, the task may be performed sequentially based on the completion of prerequisite tasks. For example, capturing inventory code may occur only after a visual inspection of the inventory. The C-GRC controller may be configured to update an agricultural compliance plan to indicate a next task awaiting completion. The C-GRC controller may then transmit an updated agricultural compliance plan to at least a complying entity that is responsible for evidencing compliance of the next task.

In some examples, the agricultural compliance plan, or update thereof, may indicate that a complying entity may interact with a participating entity to gather data to show compliance with the next task. A complying entity may be an entity that is responsible for providing evidence of compliance with a task, while a participating entity is an entity with whom the complying entity may interact to gather data to show compliance. In this example, the C-GRC controller may facilitate an exchange of cryptographic keys over a public channel between the complying entity and the participating entity. A complying entity may also be a participating entity with regards to evidencing compliance of another task. Also, a participating entity may also be a complying entity with regards to showing compliance with another task.

The purpose of exchanging cryptographic keys is two-fold. First, the exchange ensures that each of the complying the participating entities can digitally sign payload messages sent to one another. An entity receiving a digitally signed payload message may use their own cryptographic keys via a public key encryption algorithm, to verify the content and origin of the digitally signed payload message. In one example, the public key encryption algorithm may comprise of a Diffie-Helman key exchange that securely exchanges cryptographic keys over an unsecured communications channel. In this example, each of the complying entity and the participating entity may receive a cryptographic key from the C-GRC controller. Each of the complying entity and the participating entity may use their cryptographic key to generate a shared secret key, without having any knowledge of the other party's cryptographic key. The shared secret key can then be used to encrypt subsequent communications sent between the complying entity and the participating entity, via a symmetric key cipher. In this example, the C-GRC controller may share interaction-specific shared public encryption keys and a private encryption key with each of the complying and participating entities. The purpose of transmitting interaction-specific shared public encryption keys is discussed in more detail below. In the example relating to the Diffie-Helman key exchange, the interaction specific shared public encryption key and a private encryption key may be combined, in part, to generate the shared secret key. It is noteworthy that the Diffie-Helman key exchange also necessitates knowledge of a base and modulus, which can be publicly shared between the complying and participating entities.

In other examples, the predetermined public key encryption algorithm may correspond to a Rivest-Shamir-Adleman (RSA) algorithm, the Elliptic-Curve cryptography (ECC) algorithm, the Paillier cryptosystem algorithm, or the Cramer-Shoup cryptosystem algorithm, or any other suitable key generation algorithm.

Second, the C-GRC controller may distribute public encryption keys that are valid for specific interactions between a complying entity and a participating entity. In one example, the specific interactions may correspond to a plurality of interactions that are associated with showing compliance of a pending task. In another example, the specific interactions may correspond to individual interactions that are part of showing compliance of a pending task. The public encryption keys can be used as a mechanism to maintain traceability of interactions that occur as part of complying with the task of an agricultural compliance plan. For example, each interaction, or set of interactions that relate to a pending task, between a complying entity and a participating entity may have its own public encryption key. Thus, the C-GRC controller may monitor the use of the public encryption key between the sending and receiving entities (i.e. complying entity and participating entity), and further correlate each public encryption key with 1) its associated task from the agricultural compliance plan, 2) the identities of the interacting entities (i.e. complying entity or the participating entity), and 3) the payload message content of the digitally signed payload message that used the public encryption key to generate its digital signature.

Moreover, the C-GRC controller may monitor interactions between the complying entity and a participating entity via monitoring agents that reside within each entity governance controller. The C-GRC controller may interact with each monitoring agent to detect instances when each the complying entity and the participating entity interact with one another. The CRC-controller may also use the monitoring agents to detect data entries and compliance statements that are recorded within the agricultural compliance plan. In this way, the C-GRC controller may dynamically update the agricultural compliance plan to reflect the data entry or compliance statement for the task at issue, and in doing so, automatically identify the next task and/or schedule that is awaiting compliance. The C-GRC controller may then generate and transmit computer-executable instructions to the monitoring agents of entity governance controllers that cause each monitoring agent to replace an existing, stored agricultural compliance plan with the updated agricultural compliance plan. The C-GRC controller may transmit the updated agricultural compliance plan a subset of complying entities, or all complying entities, associated with the agricultural compliance plan. Additionally, the C-GRC controller may transmit the updated agricultural compliance plan to participating entities that monitor, participate, or audit the agricultural compliance plan.

In some examples, the C-GRC controller may retract compliance of a task, based on a monitored indication that compliance has been retracted. For example, C-GRC controller may detect, via monitoring agents at an entity governance controller of a complying entity and/or participating entity, that a complying entity has selectively retracted compliance of a task. Compliance may be retracted for several reasons, including a mistaken assertion of compliance, or the occurrence of an intervening act that invalidates the original compliance state. In these instances, the C-GRC controller may identify the task at-issue, and in doing so, identify other tasks and/or schedules of tasks that depend on the compliance of the task at-issue. The C-GRC controller may update the agricultural compliance plan to modify the compliance of the other tasks and/or schedule of tasks based on the retracted compliance of the task at-issue.

In various examples, the C-GRC controller can maintain traceability of physical specimens of agricultural products during the cycle of agricultural activities by fitting each agricultural product with a Radio Frequency (RF) tag, or a Quick Response (QR) code tag. The RF tag and the QR code tag may be used to record uniquely identifiable growth characteristics of the agricultural product. In this way, a recipient of an agricultural product can confirm that the received condition of the agricultural product is the same as the sent condition. In one example, the identifiable growth characteristics may include a plant identifier, plant measurements (i.e. height and weight), plant color, and/or so of forth. The identifiable growth characteristics may be included within a payload message and stored within the RF tag as a hash of the payload message. A receiving entity of the agricultural product can compare the hash stored within the RF tag with a hash stored within a digitally signed payload message received concurrently, or near-concurrently, with the agricultural product. In this example, the digitally signed payload message received concurrently, or near concurrently, corresponds to the payload message that includes the identifiable growth characteristics. A match verifies an association between the digitally signed payload message and the agricultural product. Further, the receiving entity may discern the identifiable growth characteristics of the agricultural product from the content of the digitally signed payload message.

Throughout this disclosure, the terms "crop," "agriculture," "agricultural product," and "plant," describe fruits, vegetables, or any other agricultural product that is intended for human use or consumption. The term "techniques," as used herein, may refer to system(s), method(s), computer-readable instruction(s), module(s), algorithms, hardware logic, and/or operation(s) as permitted by the context described above and through the document.

FIG. 1 illustrates an exemplary computing environment for a Centralized Governance Regulatory Compliance (C-GRC) controller. The C-GRC controller 102 may act as a centralized server tasked with governance of a cycle of agricultural activities for a crop. In various examples, the C-GRC controller 102 may be tasked to support compliance and implementation of an agricultural compliance plan that governs growth practices for particular crops. Growth practices may vary by region and commodity. As part of supporting compliance, the C-GRC controller 102 may interact with one or more entities that control activities associated with the agricultural cycle. The agricultural cycle may include activities relating to seed germination, growth, harvest, and shipment of an agricultural product from a greenhouse to a storage facility or a merchant storefront. Therefore, to monitor compliance of each of these activities, the C-GRC controller 102 may interact with at least a grower 104, a supplier 106, and an additional entity 108. The additional entity 108 may correspond to a third-party auditor, retailer, or a transport company tasked with shipping an agricultural product from the greenhouse to a merchant or storefront.

In various examples, the C-GRC controller 102 may gather compliance-related information by interacting with monitoring agents installed within entity governance controllers. Entity governance controllers may be associated with one or more entities, such as the grower 104, the supplier 106, and the additional entity 108. In the illustrated example, the C-GRC controller 102 may monitor a grower governance controller 110 associated with the grower 104, a supplier governance controller 112 associated with the supplier 106, and an additional entity governance controller 114 associated with the additional entity.

Each entity governance controller may include a current agricultural compliance plan. The C-GRC controller 102 may update each entity governance controller with an updated agricultural compliance plan that indicates a next task awaiting compliance, along with an identity of the responsible complying entity. The C-GRC controller 102 may further facilitate interaction(s) between a complying entity and a participating entity, independent of interference from the C-GRC controller 102, by distributing cryptographic keys to each of the complying entity and the participating entity, over a public channel.

For example, in order to maintain a record of traceability between a complying and participating entity, the C-GRC controller 102 may provide each entity with a private encryption key 116 and one or more interaction-specific shared public encryption keys 118. The C-GRC controller 102 may monitor each interaction between the entities, via a monitoring agent 120, based on the usage of the interaction-specific shared public encryption keys. In doing so, the C-GRC controller 102 may update the agricultural compliance plan, accordingly. The monitoring agent 120 may be configured to monitor and detect the creation, transmission and/or receipt of digitally signed payload messages 122 at the entity and report the same to the C-GRC controller 102. The monitoring agent 120 may also be configured to detect data entries and compliance statements recorded within an agricultural compliance plan by the entity via the entity governance controller.

In various examples, the C-GRC controller 102 may store captured data associated with the agricultural compliance plan within a repository 422. The repository 422 may include records of compliance relative to the agricultural compliance plan and payload messages sent between complying entities and participating entities that were part of showing compliance with the agricultural compliance plan. The C-GRC repository 422 may also include a correlation between payload messages and corresponding public encryption keys. Moreover, the C-GRC repository 422 may include a record of private encryption keys associated with complying entities and participating entities, and public encryption keys associated with their interactions.

In the illustrated example, each entity governance controller and the C-GRC controller 102 may operate on one or more distributed computing resource(s). The one or more distributed computing resource(s) may include one or more computing device(s) that operate in a cluster or other configuration to share resources, balance load, increase performance, provide fail-over support or redundancy, or for other purposes. The one or more computing device(s) may include one or more interfaces to enable communications with other networked devices via one or more network(s). The one or more network(s) may include public networks such as the Internet, private networks such as an institutional and/or personal intranet, or some combination of private and public networks. The one or more network(s) can also include any type of wired and/or wireless network, including but not limited to local area network (LANs), wide area networks (WANs), satellite networks, cable networks, Wi-Fi networks, Wi-Max networks, mobile communications networks (e.g. 3G, 4G, LTE, 5G NR-LTE, and so forth), or any combination thereof.

Figure 2:
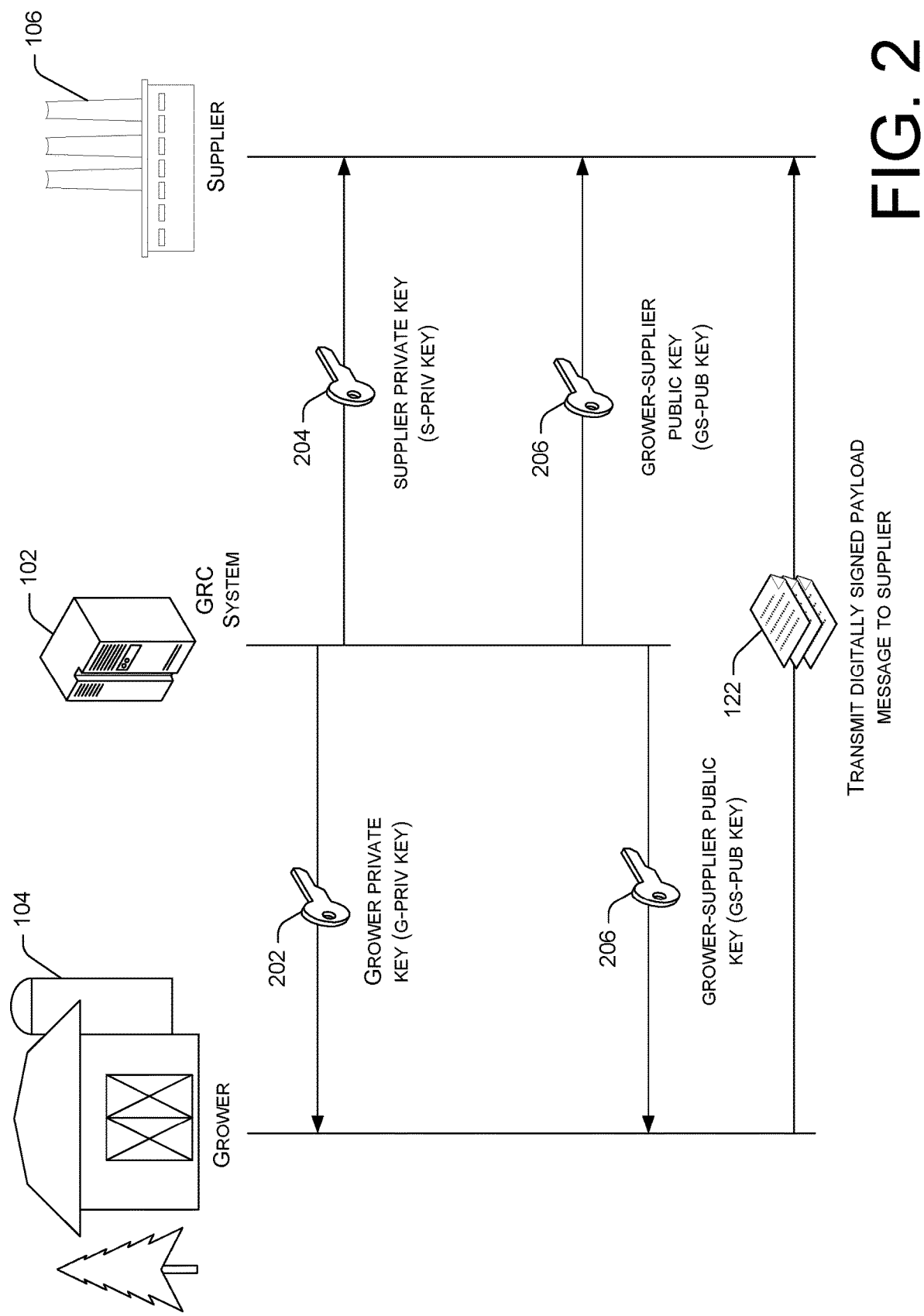
FIG. 2 illustrates a block diagram of a C-GRC controller that facilitates the sharing of public encryption keys between two entities as part of an agricultural compliance plan.

FIG. 2 illustrates a block diagram of a C-GRC controller that facilitates the sharing of public encryption keys between two entities as part of an agricultural compliance plan. In FIG. 2, the C-GRC controller 102 is shown to interact with a grower and supplier entity, however, the C-GRC controller 102 may interact with any complying or participating entity that is directly, or indirectly related to showing compliance with the agricultural compliance plan.

The C-GRC controller 102 may determine that compliance with an agricultural safety requirement necessitates interaction between one or more entities, such as a grower 104 and a supplier 106. In one example, the C-GRC controller 102 may detect an attempt by the grower 104 (i.e. complying entity) to interact with the supplier 106 (i.e. participating entity), via a monitoring agent at an entity governance controller of the grower 104. In another example, the C-GRC controller 102 may infer that such an interaction is necessary based on the nature of the task or historical compliance records. For example, the grower 104 may need to show evidence of a type and quantity of fertilizer used to enrich a crop. Thus, compliance may rely on records from the supplier 106 that show a purchase order and/or delivery receipt of the type and/or quantity of fertilizer used.

Therefore, the C-GRC controller 102 may initiate transmission of two encryption keys to each of the grower 104 and the supplier 106. First, the C-GRC controller 102 may generate and transmit a grower-private encryption key 202 (G-PRIV key) to the grower 104 and a supplier-private encryption key 204 (S-PRIV key) to the supplier 106. Each of the G-PRIV key 202 and the S-PRIV key 204 is privately held by the grower 104 and the supplier 106, respectively, and each of the G-PRIV key 202 and the S-PRIV key 204 may be reused by the grower 104 and supplier 106 for subsequent interactions between the same or other entities.

Second, the C-GRC controller 102 may generate and transmit a grower-supplier public encryption key 206 (GS-PUB key), for each specific interaction, or set of interactions that relate to a pending task, between the grower 104 and the supplier 106. In this instance, a new GS-PUB key may be generated for subsequent interactions or subsequent sets of interactions that relate to a pending task.

Continuing with the previous example, the C-GRC controller 102 may generate and transmit a GS-PUB key 206 to each of the grower 104 and supplier 106, to facilitate the grower 104 obtaining evidence of the type and quantity of the fertilizer used to enrich a crop. Since each interaction or set of interactions, between the grower 104 and the supplier 106 may be associated with a different GS-PUB key 206, the C-GRC controller 102 may keep track of each specific interaction, based on its distribution of public encryption keys (i.e. GS-PUB key 206).

In the illustrated example, the grower 104 may generate and transmit a message to the supplier 106 that is digitally signed using the G-PRIV key 202 and the GS-PUB key 206 shared by the C-GRC controller 102. In this example, the grower 104 may generate a payload message for the supplier 106 that requests information relating to the type and quantity of the fertilizer used to enrich a crop. The grower 104 may generate a digital signature for the payload message by generating a hash of the payload message using a digital signature algorithm (i.e. HMAC with SHA256, ECDSA, RSASSA-PSS, etc.) and further encrypting the hash using the G-PRIV key 202, the GS-PUB key 206 and a predetermined public key encryption algorithm, such as an RSA (Rivest, Shamir, and Adelman) key algorithm. The grower 104 may append the digital signature to the payload message to create a digitally signed payload message 122 and further transmit the digitally signed payload message 122 to the supplier 106.

Upon receipt of the digitally signed payload message 122, the supplier 106 may decrypt the digital signature using the S-PRIV key 204 and the GS-PUB key 206 shared by the C-GRC controller 102 and the predetermined public key encryption algorithm used to encrypt the digital signature. It is noteworthy that although the grower 104 used its own, privately held, G-PRIV key 202 to encrypt the digital signature, the supplier 106 may use its own, privately held, S-PRIV key 204, in combination with the GS-PUB key 206 to decrypt the same digital signature via the predetermined public key encryption algorithm.

In response to decrypting the digital signature, the supplier 106 may generate a hash of the payload message to determine whether the generated hash matches the hash retrieved from the unencrypted digital signature. A match between hashes verifies that the payload message is unchanged since being sent to the supplier 106. Additionally, the successful decryption of the digital signature to retrieve the hash further verifies the origin of the digitally signed payload message 122, namely the grower 104.

It is noteworthy that since the C-GRC controller 102 provides the grower 104 and the supplier 106 with their respective private encryption keys, namely the G-PRIV key 202 and the S-PRIV key 204, and the public encryption key, GS-PUB key 206, the C-GRC controller 102 may intercept (i.e. via a monitoring agent that resides at an entity governance controller of the grower 104 and/or supplier 106) and decrypt digitally signed payload messages sent between the grower 104 and supplier 106. In doing so, the C-GRC controller 102 may maintain an independent record of communications between the grower 104 and supplier 106. Such records may facilitate an audit of an agricultural operation at a later point in time.

Figure 3:
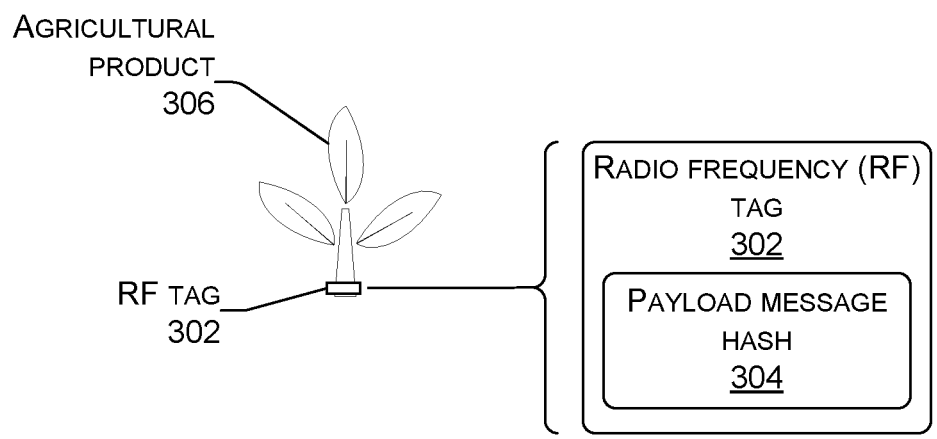
FIG. 3 illustrates a physical specimen of plant-based product that is fitted with a Radio Frequency (RF) tag.

FIG. 3 illustrates a physical specimen of an agricultural product that is fitted with a Radio Frequency (RF) tag. The RF tag 302 is intended to store a hash 304 of a payload message that is associated with the agricultural product 306.

When an agricultural product 306 is shipped between entities, such as a greenhouse and retail outlet, agricultural safety requirements may mandate traceability of the shipment (i.e. agricultural products) during the transport phase. Compliance may mandate a record of identifiable growth characteristics such as plant identifiers (i.e. crop identifiers, greenhouse identifiers, batch identifiers), plant characteristics (i.e. plant weight), and/or any other uniquely identifiable growth parameter. An RF tag 302 may be used to store such information. The RF tag 302 may be physically tied to each agricultural product (or grouping thereof) such that the identifiable growth characteristics are physically accessible at the agricultural product while it is being moved between locations. Storing such information on an RF tag 302, or similar device can be made in human-readable form or machine-readable form. Storing such information in human-readable form may require the RF tag 302 to include a Central Processing Unit (CPU) that is more powerful than a counterpart RF tag 302 that is configured to store the information in a machine-readable form. Therefore, to reduce the relative power requirements of a CPU of the RF tag 302, the identifiable growth characteristics may be stored within the RF tag 302 as a hash (i.e. machine-readable form). Doing so may reduce the relative power requirements of the CPU of the RF tag 302, which further reduces the cost of the RF tag 302 and improves a likely adoption rate of the technology.

The purpose of uploading a hash 304 of the payload message onto the RF tag 302 is to generate an association between the agricultural product 306 and a digitally signed payload message that is sent to the entity that is to receive the agricultural product 306. In this way, an entity that receives the agricultural product 306 can compare the hash 304 stored on the RF tag 302 with a hash stored within a digitally signed payload message this is received concurrently, or near concurrently. A match verifies an association between the digitally signed payload message and the agricultural product 306. Further, the entity receiving the agricultural product 306 may review the content of the digitally signed payload message to discern the identifiable growth characteristics of the agricultural product 306.

Consider the following example. A sending entity may generate digitally signed payload message that includes the weight and plant identifier of an agricultural product 306 that is to be shipped to a receiving entity. Upon receipt of the agricultural product 306 and the digitally signed payload message, the receiving entity may compare the hash associated with the digitally signed payload message with the hash stored on the RF tag 302 of the agricultural product 306. A match may verify the content of the digitally signed payload message, which may include the weight and plant identifier of the agricultural product 306. The origin of the agricultural product 306 and digitally signed payload message is implicitly verified by decrypting the digital signature to retrieve the hash.

Moreover, while the illustrated example centers on storing the hash 304 of the payload message within an RF tag 302, alternative embodiments may include storing the hash 304 of the payload message within a Quick Response (QR) code, or any other machine-readable code that can be physically tied to an agricultural product 306.

Figure 4:
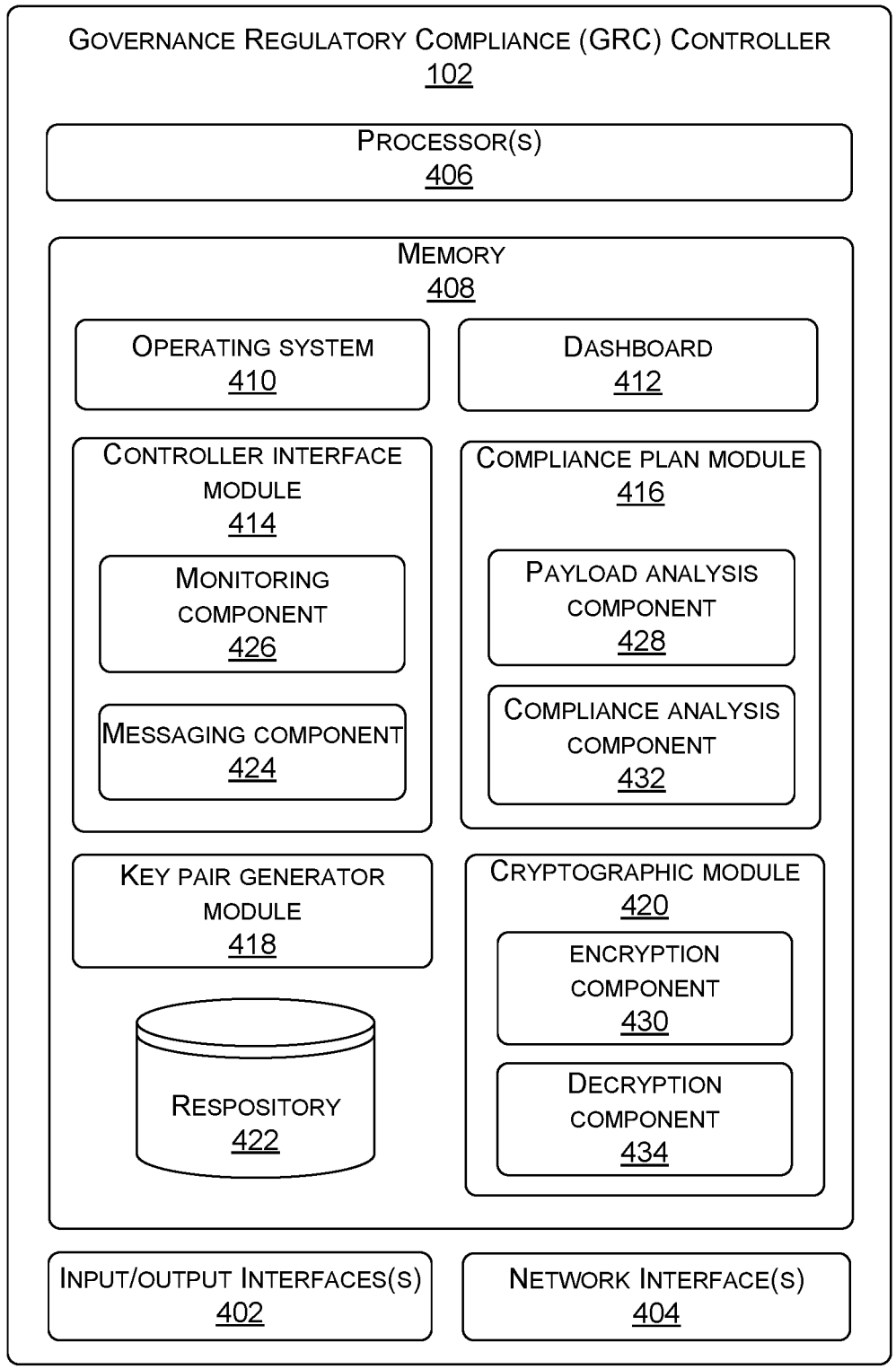
FIG. 4 illustrates a block diagram of various components of a Governance Regulatory Compliance (C-GRC) controller.

FIG. 4 illustrates a block diagram of various components of a Centralized Governance Regulatory Compliance (C-GRC) controller. The C-GRC controller 102 may act as a centralized server tasked with governance of a cycle of agricultural activities for an agricultural product. The agricultural cycle may include activities relating to growth, harvest, and shipment of an agricultural product from one entity to another. In various examples, the C-GRC controller 102 may be tasked to support compliance and implementation of an agricultural compliance plan that governs growing practices for particular crops that can vary by region and commodity.

The C-GRC controller 102 may include input/output interface(s) 402. The input/output interface(s) 402 may include any type of output interface known in the art, such as a display (e.g. a liquid crystal display), speakers, a vibrating mechanism, or a tactile feedback mechanism. Input/output interface(s) 402 also include ports for one or more peripheral devices, such as headphones, peripheral speakers, or a peripheral display. Further, the input/output interface(s) 402 may further include a camera, a microphone, a keyboard/keypad, or a touch-sensitive display. A keyboard/keypad may be a push button numerical dialing pad (such as on a typical telecommunication device), a multi-key keyboard (such as a conventional QWERTY keyboard), or one or more other types of keys or buttons, and may also include a joystick-like controller and/or designated navigation buttons, or the like.

Additionally, the C-GRC controller 102 may include network interface(s) 404. The network interface(s) 404 may include any sort of transceiver known in the art. For example, the network interface(s) 404 may include a radio transceiver that performs the function of transmitting and receiving radio frequency communications via an antenna. In addition, the network interface(s) 404 may also include a wireless communication transceiver and a near-field antenna for communicating over unlicensed wireless Internet Protocol (IP) networks, such as local wireless data networks and personal area networks (e.g. Bluetooth or near field communication (NFC) networks). Further, the network interface(s) 404 may include wired communication components, such as an Ethernet port or a Universal Serial Bus (USB).

Further, the C-GRC controller 102 may include one or more processor(s) 406 that are operably connected to memory 408. In at least one example, the one or more processor(s) 406 may be a central processing unit(s) (CPU), graphics processing unit(s) (GPU), or both a CPU and GPU or any other sort of processing unit(s). Each of the one or more processor(s) 406 may have numerous arithmetic logic units (ALUs) that perform arithmetic and logical operations as well as one or more control units (CUs) that extract instructions and stored content from processor cache memory, and then executes these instructions by calling on the ALUs, as necessary during program execution. The one or more processor(s) 406 may also be responsible for executing all computer applications stored in the memory, which can be associated with common types of volatile (RAM) and/or non-volatile (ROM) memory.

In some examples, memory 408 may include system memory, which may be volatile (such as RAM), non-volatile (such as ROM, flash memory, etc.) or some combination of the two. The memory may also include additional data storage devices (removable and/or non-removable) such as, for example, magnetic disks, optical disks, or tape.

The memory 408 may further include non-transitory computer-readable media, such as volatile and nonvolatile, removable and non-removable media implemented in any method or technology for storage of information, such as computer readable instructions, data structures, program modules, or other data. System memory, removable storage, and non-removable storage are all examples of non-transitory computer-readable media. Examples of non-transitory computer-readable media include, but are not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other non-transitory medium which can be used to store the desired information.

In the illustrated example, the memory 408 may include an operating system 410, a dashboard 412, a controller interface module 414, a compliance plan module 416, a key pair generator module 418, a cryptographic module 420, and a repository 422. The operating system 410 may be any operating system capable of managing computer hardware and software resources. The operating system 410 may include an interface layer that enables applications to interface with the input/output interface(s) 402 and the network interface(s) 404. The interface layer may comprise public APIs, private APIs, or a combination of both. Additionally, the operating system 410 may include other components that perform various other functions generally associated with an operating system.

The dashboard 412 may be configured to receive an input from an administrator and/or operator of the C-GRC controller 102. An example input may include but are not limited to, agricultural safety requirements, amendments or additions to an agricultural compliance plan, the inclusion of additional entities that participate in the agricultural compliance plan as complying entities or participating entities and/or so forth. Additionally, the example input may also include identifying types of data that are to be captured to evidence compliance with an agricultural safety requirement. For example, an agricultural safety requirement may require an inspection of a transport vehicle prior to shipment of agricultural products. Thus, an operator or administrator may request, via the dashboard 412, evidence of compliance with the agricultural safety requirement. In this example, evidence may include a visual inspection of an empty trailer prior to loading the shipment, an image of the empty trailer prior to loading the shipment, proof of environmental conditions within the trailer, such as temperature, moisture, ambient light intensity, etc., or any combination thereof. In various examples, a request from an operator or administrator may take the form of a payload message that is sent to a complying entity as a digitally signed payload message via the messaging component 424.

The controller interface module 414 may further include a monitoring component 426 and a messaging component 424. The monitoring component 426 may interact and retrieve data from one or more monitoring agents that reside on entity governance controllers. The monitoring agents may monitor and detect the creation, transmission, and/or receipt of a digitally signed payload message at a complying entity or a participating entity. The monitoring agents may also be configured to detect data entries and compliance statements recorded within an agricultural compliance plan via dashboard 412.

In various examples, the monitoring component 426 may monitor and retrieve data from each monitoring agent at a complying and/or participating entity on a continuous basis, per a predetermined schedule, or in response to a triggering event. The predetermined schedule may correspond to time intervals of one hour, six hours, or 12 hours. Any time interval is possible. Further, the triggering event may correspond to receipt of an indication from a complying entity or a participating entity that a digitally signed payload message has been created, transmitted, or received. The monitoring component 426 may intercept a copy of the digitally signed payload message during transmission between the complying entity and the participating entity.

In some examples, the controller interface module 414 may detect, via the monitoring component 426, an attempt of a complying entity (i.e. entity governance controller of the complying entity) to retract compliance of a task associated with an agricultural compliance plan. Compliance may be retracted for several reasons, including a mistaken assertion of compliance, or the occurrence of an intervening act that invalidates the original compliance state.

For example, consider a task that requires a visual inspection of a trailer of a transport vehicle prior to shipment of agricultural products from one location to another. An authorized person may have initially conducted the visual inspection and indicated the same on the agricultural compliance plan. However, subsequent to the visual inspection, an intervening act (i.e. a spillage or vehicle damage) may invalidate the original compliance. In this instance, the authorized person may retract the original compliance associated with the task via their entity governance controller.

The messaging component 424 may be configured to transmit private and public encryption keys generated by the key pair generator module 418 to complying and participating entities in order to facilitate their interactions. In some examples, the messaging component 424 may interact with the compliance analysis component 430 to determine whether a complying entity is to interact with a participating entity to gather to show compliance with a task of an agricultural compliance plan. In the event that the complying entity is to interact with a participating entity, the messaging component 424 may interact with the key pair generator module 418 to retrieve a private encryption key of the complying entity (C-PRIV key), a private encryption key of the participating entity (P-PRIV key), and a public encryption key that is specific to the instant interaction between the complying entity and the participating entity (CP-PUB key).

Further, the messaging component 424 may transmit the C-PRIV key, and the CP-PUB key to the complying entity, and the P-PRIV key and the CP-PUB key to the participating entity.

The compliance plan module 416 may further include a compliance analysis component 430 and a payload analysis component 428. The compliance analysis component 430 may analyze an agricultural compliance plan to identify a next schedule awaiting completion. In some examples, the compliance analysis component 430 may determine whether a compliance schedule includes incomplete tasks that are dependent on the completion of another schedule. For example, a plant harvest schedule may be dependent on completion of a plant growth schedule, and an agricultural shipment schedule may be similarly dependent on completion of a plant growth schedule.

In response to identifying the next schedule, the compliance analysis component 430 may further identify the next task within the schedule that awaits completion. The next task may correspond to an automated action or a manual action that is to be performed by an authorized person. An automated action may include monitoring environmental conditions within the agricultural production environment (i.e. greenhouse, distribution center, agricultural packaging facility, or transport vehicle and/or so forth). Environmental conditions may include but are not limited to, temperature, humidity, odor, or precipitation. A manual action may include a visual inspection of agricultural production articles (i.e. crops, rafts, pools, boxes, clamshells, and/or so forth) to identify damage, contamination, cleanliness, or unwanted odors.

The compliance analysis component 430 may determine whether the next task involves a complying entity interacting with another participating entity. In one example, the compliance analysis component 430 may infer that an interaction is necessary based on the monitoring component 426 detecting an attempt by a complying entity to interact with a participating entity. The participating entity may be known or unknown to the C-GRC controller 102. The compliance analysis component 430 may also infer that such an interaction is necessary based on the nature of the pending task or a historical compliance record.

In one example, the compliance analysis component 430 may determine that the complying entity need not interact with a participating entity to show compliance with a pending task. For example, the task may relate to a visual or automated inspection of an agricultural product or agricultural facility. In another example, the compliance analysis component 430 may determine that complying entity requires data from a participating entity, such as proof of purchase from a supplier, to evidence compliance with a next task. In each of these examples, the compliance analysis component 430 may identify and annotate identifiers of the complying entity and participating entity that are associated with compliance of the next task.

In some examples, the compliance analysis component 430 may interact with the controller interface module 414, to determine that the compliance state of a task has been, or is to be, retracted. Retraction of a compliance state may occur for many reasons, including an inadvertent or mistaken assertion of compliance, or the occurrence of an intervening act that invalidates the original compliance state.

In this example, the compliance analysis component 430 may identify the task at-issue, and in doing so, identify other tasks and/or schedules that depend on the compliance of the task at-issue. Further, the compliance analysis component 430 may modify the compliance state of the other tasks and/or schedules based on the retracted compliance state of the task at-issue. For example, consider a seed management schedule that includes at least three tasks. Task one may relate to a visual inventory inspection, task two may relate to capturing inventory code, and task three may relate to monitoring inventory water conditions. Within the seed management schedule, compliance of task three may be dependent on the compliance of task two, and compliance of task two may be dependent on the compliance of task one. In the event that compliance of task one is retracted, the compliance analysis component 430 may dynamically retract compliance of task two and task three due to their dependency on task one. Further, the compliance analysis component 430 may identify task one, for which compliance was retracted, as the next task within the schedule that awaits completion.

The payload analysis component 428 may be configured to annotate a specific task within the agricultural compliance plan to include public encryption keys that correspond to interactions performed by the complying entity as part of showing compliance with the specific task. The purpose of doing so is to maintain traceability of communications as they occur and relate to tasks within the agricultural compliance plan. Since each interaction between a complying entity and participating entity, or a complying entity and the C-GRC controller, is assigned a specific public encryption key, by annotating each task of the compliance plan to record each specific public encryption key, the C-GRC controller 102 can maintain traceability of interactions that occur as part of a complying entity showing compliance with each task.

The key pair generator module 418 may generate private encryption keys and public encryption keys using a key generation algorithm, such as the Rivest-Shamir-Adleman (RSA) algorithm, the Elliptic-Curve cryptography (ECC) algorithm, the Paillier cryptosystem algorithm, or the Cramer-Shoup cryptosystem algorithm, or any other suitable key generation algorithm. The key pair generator module 418 may be configured to generate a private encryption key for each complying and participating entity that is associated with the agricultural compliance plan. Additionally, a public encryption key may be generated for each interaction between a complying entity and a participating entity. In some examples, the C-GRC controller 102 may use the record of public encryption keys as a mechanism to audit interactions between complying and participating entities.

The cryptographic module 420 may decrypt a digitally signed payload message sent between a complying entity and a participating entity. In this example, the cryptographic module 420 may interact with the monitoring component 426 of the controller interface module 414 to retrieve digitally signed payload messages intercepted between the complying entity and the participating entity. The cryptographic module 420 may decrypt a digital signature of a digitally signed payload message using one of a private encryption key of the complying entity (C-PRIV key), a private encryption key of the participating entity (P-PRIV key), a public encryption key specific to the interaction between the complying entity and participating entity (CP-PUB key), and the predetermined public key encryption algorithm. Since the C-GRC controller 102 provided the complying entity with the C-PRIV key and the CP-PUB key, and the participating entity with the P-PRIV key and the CP-PUB key, the C-GRC controller 102 maintains a record of these keys and may use these keys to decrypt digitally signed payload messages intercepted between the complying entity and the participating entity.

The repository 422, which corresponds to repository 124, may include a repository of private encryption keys, public encryption keys associated with interacting complying and participating entities. The repository 422 may further include a repository of payload messages sent between the C-GRC controller 102, complying entities, and participating entities that were part of showing compliance within the agricultural compliance plan. Each payload message may be associated with its corresponding public encryption key. Further, the repository 422 may include historical instances of the compliance plan, and data captured as part of showing compliance with specific tasks within the compliance plan.

Figure 5:
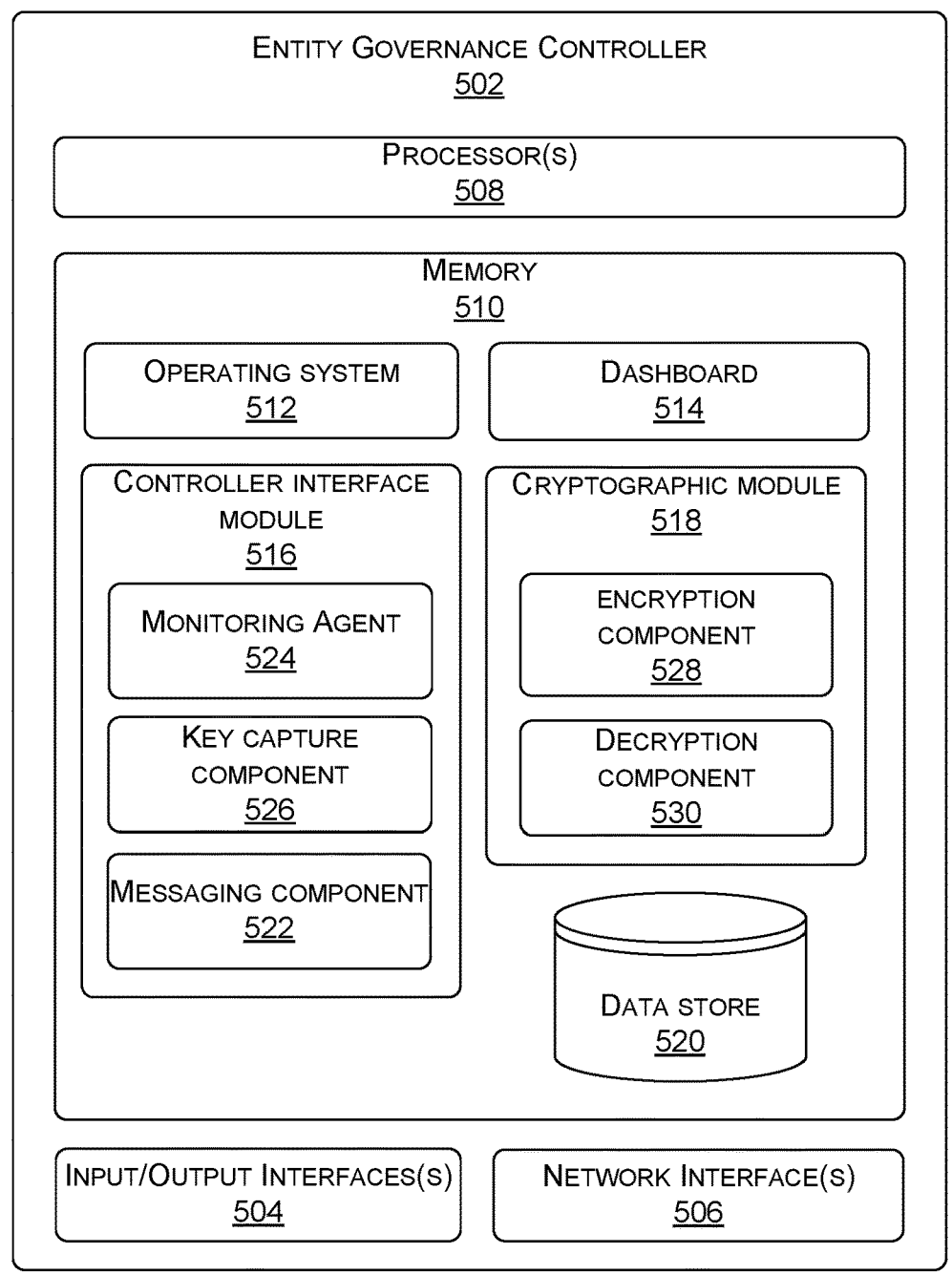
FIG. 5 illustrates a block diagram of various components of an Entity Governance Controller.

FIG. 5 illustrates a block diagram of various components of an Entity Governance Controller. The entity governance controller may be associated with a complying entity or a participating entity. In one example, a complying entity governance controller may interact with a C-GRC controller 102 to evidence compliance with an agricultural compliance plan. In another example, the complying entity may interact with a participating entity governance controller to gather data from the participating entity as part of showing compliance with the agricultural compliance plan.

The entity governance controller 502 may correspond to the grower governance controller 110, the supplier governance controller 112, and the additional entity governance controller 114. Further, the entity governance controller 502 may include input/output interface(s) 504 and network interface(s) 506. The input/output interface(s) 504 may be similar to the input/output interface(s) 402 and the network interface(s) 506 may be similar to the network interface(s) 404.

The entity governance controller 502 may include one or more processor(s) 508 that is operably connected to memory 510. The one or more processor(s) 508 may be similar to the one or more processor(s) 406 and the memory 510 may be similar to the memory 408.

In the illustrated example, the memory 510 may include an operating system 512, a dashboard 514, a controller interface module 516, a cryptographic module 518, and a data store 520. The operating system 512 may be any operating system capable of managing computer hardware and software resources. The operating system 512 may include an interface layer that enables applications to interface with the input/output interface(s) 504 and the network interface(s) 506. The interface layer may comprise public APIs, private APIs, or a combination of both. Additionally, the operating system 512 may include other components that perform various other functions generally associated with an operating system.

The dashboard 514 may be configured to receive an input from an administrator and/or an operator of the entity governance controller 502. An example input may include but is not limited to, annotations associated with a task of an agricultural compliance plan, multimedia data (i.e. video, images, etc.) that relates to the compliance of a task of the agricultural compliance plan, or a combination of both. Additionally, an input may retract a compliance state of a task of the agricultural compliance plan. A retraction of compliance may occur for several reasons, namely a mistaken or inadvertent assertion of compliance, or due to the occurrence of an intervening act that invalidates the original compliance.

An example input may also include payload messages that are intended for delivery to a participating or complying entity. The payload messages may be sent to the participating or complying entity as digitally signed payload messages via the messaging component 522.

The controller interface module 516 may further include a monitoring agent 524, a key capture component 526, and the messaging component 522. The monitoring agent 524 is configured to monitor and detect the creation, transmission, and/or receipt of a digitally signed payload message at the entity governance controller 502. The monitoring agent 524 may also detect data entries and compliance statements that are recorded within the agricultural compliance plan and communicate the same to the C-GRC controller 102. In various examples, the monitoring component 426 of the C-GRC controller 102 may interact with the monitoring agent 524 on a continuous basis, per a predetermined schedule, or in response to a triggering event. The predetermined schedule may correspond to time intervals of one hour, six hours, or 12 hours, however, any time interval is possible. The triggering event may correspond to an indication from the monitoring agent 524 to the monitoring component 426 of the C-GRC controller 102 that a digitally signed payload message has been created, transmitted, or received.

The key capture component 526 may be configured to receive, from the C-GRC controller 102, a private encryption key associated with the entity governance controller 502 and one or more public encryption keys that are associated with specific interactions between the entity governance controller 502 and one of a complying entity or a participating entity. For example, the C-GRC controller 102 may detect that a complying entity is to interact with a participating entity to gather data for compliance of a task of an agricultural compliance plan. In doing so, the C-GRC controller 102 may transmit a C-PRIV key (i.e. complying entity private encryption key) and a CP-PUB key (i.e. complying-participating entity public encryption key) to the entity governance controller 502 of the complying entity. The complying entity may receive the C-PRIV key and CP-PUB key at the key capture component 526, and further use the keys to facilitate an interaction with the participating entity. It is noteworthy that the C-GRC controller 102 simultaneously transmits a P-PRIV key (i.e. participating entity private encryption key) and the CP-PUB key to an entity governance controller associated with the participating entity.

The messaging component 522 may transmit digitally signed payload messages received from the dashboard 514 to another entity, such as a complying entity or a participating entity. In some examples, the messaging component 522 may also transmit hashes of payload messages to RF tags, or QR code tags, that are fitted to physical specimens of agricultural products. In this example, the encryption component 528 may generate a hash of a payload message, and the messaging component 522 may transmit the hash to the RF tag or QR code tag.

The cryptographic module 518 may include an encryption component 528 and a decryption component 530. The encryption component 528 may generate a digitally signed payload message for delivery to another entity, such as a complying entity or a participating entity. The encryption component 528 may interact with dashboard 514 to retrieve a payload message associated with the instant interaction. In doing so, the encryption component 528 may generate a digital signature for the payload message by generating a hash of the payload message using a digital signature algorithm (i.e. HMAC with SHA256, ECDSA, RSASSA-PSS, etc.) and further encrypt the hash using a private encryption key, a public encryption key, and a predetermined public key encryption algorithm. In this example, the encryption component 528 receives the private encryption key and the public encryption key from the key capture component 526.

In one example, the predetermined public key encryption algorithm may include a Diffie-Helman key exchange that securely exchanges cryptographic keys over a public, unsecured communication channel. In this example, each of the complying entity and the participating entity may receive a cryptographic key from the C-GRC controller. Each of the complying entity and the participating entity may use their cryptographic key to generate a shared secret key, without having any knowledge of the other party's cryptographic key. The shared secret key can then be used to encrypt subsequent communications sent between the complying entity and the participating entity, using a symmetric key cipher. In other examples, the predetermined public key encryption algorithm may correspond to one of a Rivest-Shamir-Adleman (RSA) algorithm, the Elliptic-Curve cryptography (ECC) algorithm, the Paillier cryptosystem algorithm, or the Cramer-Shoup cryptosystem algorithm, or any other suitable key generation algorithm.

The private encryption key may be associated with the entity of the entity governance controller 502 and the public encryption key may be specific to the interaction between the entity of the entity governance controller 502 and the other entity that is to receive the payload message (i.e. complying entity or participating entity). For example, consider the entity of the entity governance controller 502 as being a complying entity that is to interact with a participating entity to gather data to show compliance with a task of the agricultural compliance plan. In this example, the encryption component 528 may generate the digital signature using the complying entity private encryption key (i.e. C-PRIV key), a public encryption key specific to the interaction between the complying entity and the participating entity (i.e. CP-PUB key), and the predetermined public key encryption algorithm.

The encryption component 528 may further append the digital signature to the payload message to create a digitally signed payload message and transmit the digitally signed payload message to the messaging component 522. In this example, the messaging component 522 may transmit the digitally signed payload message to its intended recipient.

The decryption component 530 may decrypt a digitally signed payload message received via the controller interface module 516. More specifically, the decryption component 530 may decrypt the digital signature using a private encryption key associated with the entity of the entity governance controller 502, a public encryption key specific to the interaction with the entity that sent the digitally signed payload message, and the predetermined public key encryption algorithm. Continuing with the previous example, consider the entity of the entity governance controller 502 as being a complying entity that receives a digitally signed payload message from a participating entity. The digitally signed payload message may include data for compliance of a task of the agricultural compliance plan. In this example, the decryption component 530 may retrieve the C-PRIV key and CP-PUB key from the key capture component 526, and in doing so, decrypt the digital signature of the digitally signed payload message using the C-PRIV key, the CP-PUB key, and the predetermined public key encryption algorithm.

In response to decrypting the digital signature, the entity governance controller 502 may generate a hash of the payload message to determine whether the generated hash matches the hash retrieved from the unencrypted payload message. A match verifies that the payload message is unchanged since being sent by the participating entity. Further, the successful decryption of the digital signature to retrieve the hash further verifies the origin of the digitally signed payload message.

The data store 520 may include a repository of the private encryption key associated with the entity governance controller and the public encryption keys associated with interacting complying and participating entities. The data store may further include historical instances of data captured by the entity governance controller 502 as part of showing compliance with specific tasks within the agricultural compliance plan.

FIGS. 6A, 6B, and 6C illustrate exemplary embodiments of an agricultural compliance plan. FIG. 6A illustrates an exemplary compliance plan that includes a plurality of schedules. FIG. 6B illustrates an exemplary schedule of the compliance plan that includes a plurality of tasks. FIG. 6C illustrates an exemplary task that includes a plurality of actions.

Referring to FIG. 6A, the agricultural compliance plan 602 may be based on governmental and/or non-governmental rules and best practices that govern an agricultural operation. The agricultural compliance plan 602 may be developed to monitor each phase of agriculture from seed management through to shipment. In the illustrated example, the agricultural compliance plan 602 includes a plurality of schedules that each reflect a divisible phase of an agricultural operation. For example, the agricultural compliance plan 602 may include but is not limited to, a schedule for seed management, plant growth, plant harvest, and agricultural shipment.

Each schedule of the agricultural compliance plan 602 may further include a listing of interacting entities, dependencies, data integration, and compliance status. The listing of interacting entities includes different facilities that may interact with one another as part of showing compliance with each schedule. Each interacting entity is designated as a "complying entity," labeled as "(C)" in FIG. 6A, or a "participating entity," labeled as "(P)" in FIG. 6A. A complying entity may be an entity that is responsible for providing evidence of compliance, while a participating entity is an entity with whom a complying entity may interact to gather data for compliance. For example, in FIG. 6A, the "seed management" schedule includes a listing of at least three interacting entities, namely a supplier, warehouse, and auditor. The supplier and auditor are identified as complying entities, meaning that they are responsible for providing evidence for compliance with the seed management schedule. The "warehouse" is identified as a participating entity, meaning that the warehouse need only provide data, as requested, to one of the complying entities as part of showing compliance to the seed management schedule.

Moreover, the dependencies listed within the agricultural compliance plan indicate a sequential order that schedules of the compliance plan are completed. In other words, the dependencies identify whether the execution of one schedule is dependent on the completion of another. Referring to FIG. 6A, the "plant harvest" schedule is dependent on the completion of "plant growth" schedule, which in turn is dependent on the completion of the "seed management" schedule. Thus the "plant harvest" schedule may be executed following the completion of the seed management schedule and the plant growth schedule.

The data integration refers to the capturing of compliance data associated with the agricultural compliance plan. The data captured may include electronic copies of documents evidencing compliance, multimedia content evidencing compliance, compliance statements penned by authorized personnel, or any combination thereof. In some examples, the data captured may also include payload messages sent between interacting entities along with their corresponding public encryption keys. The public encryption keys, which are discussed in more detail with reference to FIGS. 4 and 5, may be used to maintain traceability of interactions associated with compliance of a schedule.

FIG. 6B illustrates a schedule 604 of the agricultural compliance plan 602. The schedule 604 may include a listing of divisible tasks that are to be completed for the schedule 604 to be compliant. Similar to the agricultural compliance plan 602, the schedule may be based on governmental and/or non-governmental safety rules and industry best practices that govern an agricultural operation. In the illustrated example, the "seed management" schedule may include a plurality of tasks, namely, a visual inventory inspection, capturing inventory code, monitoring water conditions, a food safety audit, and monitoring facility environmental conditions. Similar to the agricultural compliance plan 602 of FIG. 6A, the schedule 604 may include a listing of entities responsible for showing compliance with a task (i.e. complying entities and participating entities), dependencies, and compliance status.

FIG. 6C illustrates a task 606 of schedule 604. The task 606 may include a listing of divisible action items that are to be completed for the task 606 to be compliant. Similar to schedule 604 and the agricultural compliance plan 602, task 606 may be based on governmental and/or non-governmental safety controls and best practices that govern an agricultural operation. In the illustrated example, the "visual inventory inspection" task may include a plurality of actions, namely a visual inspection of seeds, trays, rafts, and automated inspection of media, fertilizer, and pesticides. Similar to the agricultural compliance plan 602 of FIG. 6A, the task 606 may include data integration and compliance status.

FIGS. 7 through 12 present processes 700 through 1200 that relate to operations of the Governance Regulatory Compliance (C-GRC) system 102. Each of processes 700 through 1200 illustrate a collection of blocks in a logical flow chart, which represents a sequence of operations that can be implemented in hardware, software, or a combination thereof. In the context of software, the blocks represent computer-executable instructions that, when executed by one or more processors, perform the recited operations. Generally, computer-executable instructions may include routines, programs, objects, components, data structures, and the like that perform particular functions or implement particular abstract data types. The order in which the operations are described is not intended to be construed as a limitation, and any number of the described blocks can be combined in any order and/or in parallel to implement the process. For discussion purposes, the processes 700 through 1200 are described with reference to the computing environment 100 of FIG. 1.

Figure 7:
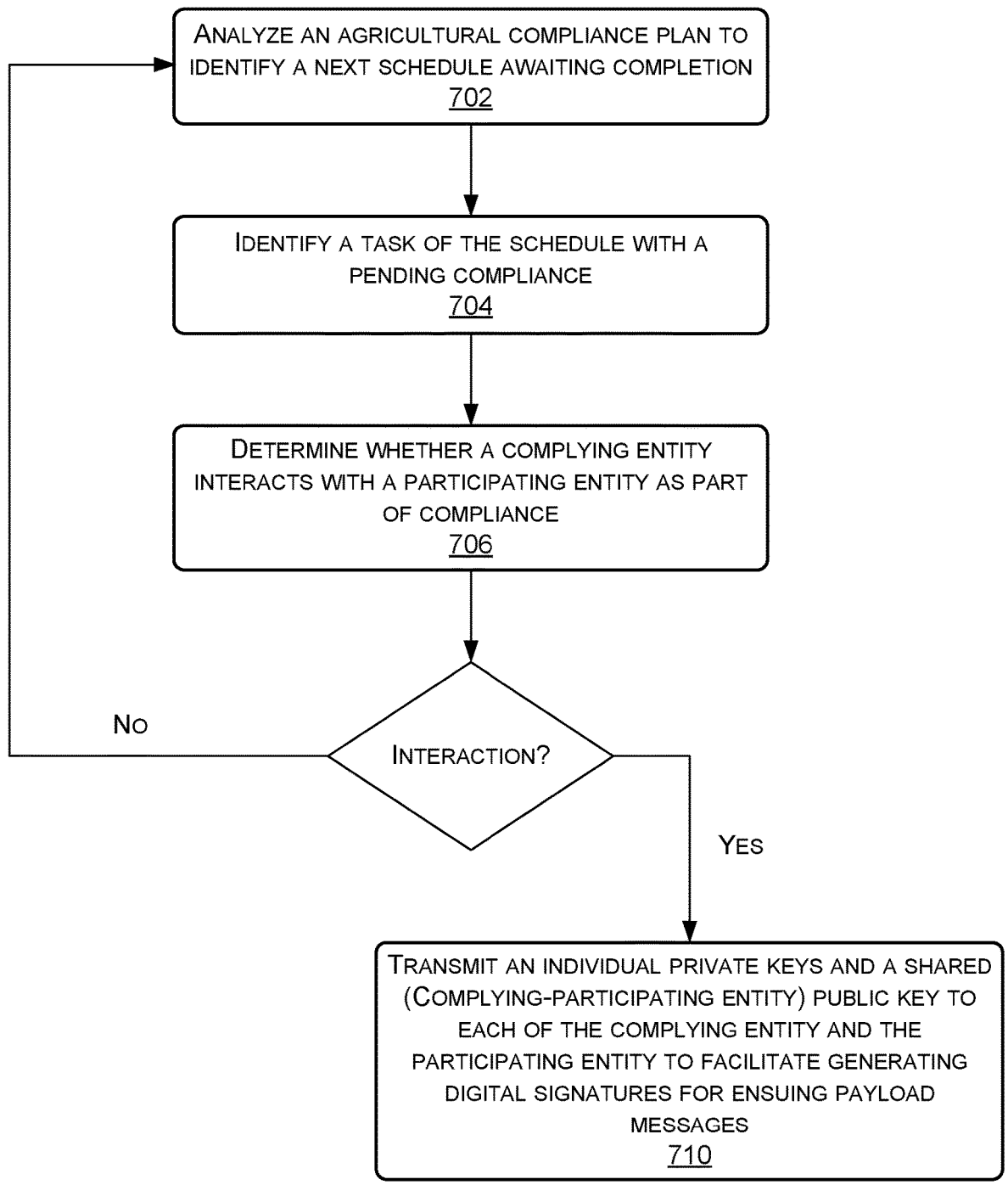
FIG. 7 illustrates a process for analyzing an agricultural compliance plan to identify one or more entities that may need to interact to show compliance with an agricultural safety control requirement.

FIG. 7 illustrates a process for analyzing an agricultural compliance plan to identify one or more entities that may need to interact to show compliance with an agricultural safety control requirement. Various agricultural safety control processes require any interaction between a complying entity and another, participating entity. For example, the management of seeds may include capturing data relating to the source, quality, and quantity of seeds and/or fertilizer. In these examples, data relating to the source and quality of seeds and/or fertilizers may be verified via a recorded interaction between the supplier that provided the seeds and/or fertilizer, and the grower that took ownership of the seeds and/or fertilizer from the supplier.

At 702, the C-GRC controller may analyze an agricultural compliance plan to identify a next schedule awaiting completion of one or more pending tasks. Referring to FIG. 6A, the C-GRC controller may determine that schedule 2 (plant growth), schedule 3 (plant harvest), and schedule N (agricultural shipment) each include tasks that remain incomplete. The C-GRC controller may further determine whether each schedule with incomplete tasks are dependent on the completion of another schedule. Again, referring to FIG. 6A, schedule 3 (plant harvest) is shown as being dependent on schedule 2 (plant growth), and schedule N (agricultural shipment) is shown as being dependent on at least schedule 3 (plant harvest). Since schedule 2 remains active, the C-GRC controller may determine that schedule 2 is the next schedule awaiting completion of one or more tasks. It is noteworthy that the C-GRC controller may identify a plurality of next schedules awaiting completion of one or more tasks, provided that schedule dependencies allow for more than one schedule to be executed at the same time.

At 704, the C-GRC controller may identify a next task of the identified schedule (from step 702) that awaits compliance. The next task may necessitate an automated action or a manual action that is to be performed by an authorized person.

At 706, the C-GRC controller may determine whether the next task involves a complying entity interacting with another, participating entity. In one example, the next task may involve a visual or automated inspection of an agricultural production environment to verify cleanliness, sanitation, and/or zero contamination requirements. In this example, the visual or automated inspection may be performed by the complying entity within the agricultural production environment. In another example, the next task may involve the shipment of agricultural products from a grower's facility following a plant harvest. In this example, the complying entity may be a distributor, and the next task may involve sanitation compliance of a transport vehicle used to ship the agricultural products to a retail outlet. The distributor may interact with the grower's facility to confirm box and pallet sizes, sanitation and/or environmental requirements (i.e. temperature control, humidity control, etc.) for the agricultural products during transport.

At 708, the C-GRC controller may determine that a complying entity need not interact with another, participating entity to comply with an agricultural safety requirement. In doing so, process 700 may return to step 702, and the C-GRC controller may continue to analyze the agricultural compliance plan. It is noteworthy that the C-GRC controller may detect an update to the agricultural compliance plan, by the complying entity, that indicates compliance with a task. In this regard, the C-GRC controller may update the agricultural compliance plan based on data retrieved from the complying entity. Data may relate to data entries and compliance statements recorded within the agricultural compliance plan. Data entries may include anecdotal and/or automated inspection (i.e. multimedia) data associated with compliance of an inspection task. In one example, data entries may be automated. For example, an entity governance controller may analyze the next task and incorporate data from one or more sensors that automatically capture sensor data related to the next task. The one or more sensors may include environmental sensors (i.e. thermometer, heat sensor, humidity sensor, olfactory sensor, light intensity sensor, etc.).

At 710, the C-GRC controller may determine that a complying entity is to interact with another, participating entity to comply with an agricultural safety requirement. In doing so, the C-GRC controller may transmit a pair of cryptographic keys to each of the complying entity and the participating entity. The complying entity may receive a complying entity private encryption key (C-PRIV key) and a complying-participating entity shared public encryption key (CP-PUB key) that is specific to the immediate interaction between the complying and participating entities. Similarly, the participating entity may receive a participating entity private encryption key (P-PRIV key) and the CP-PUB key.

Figure 8:
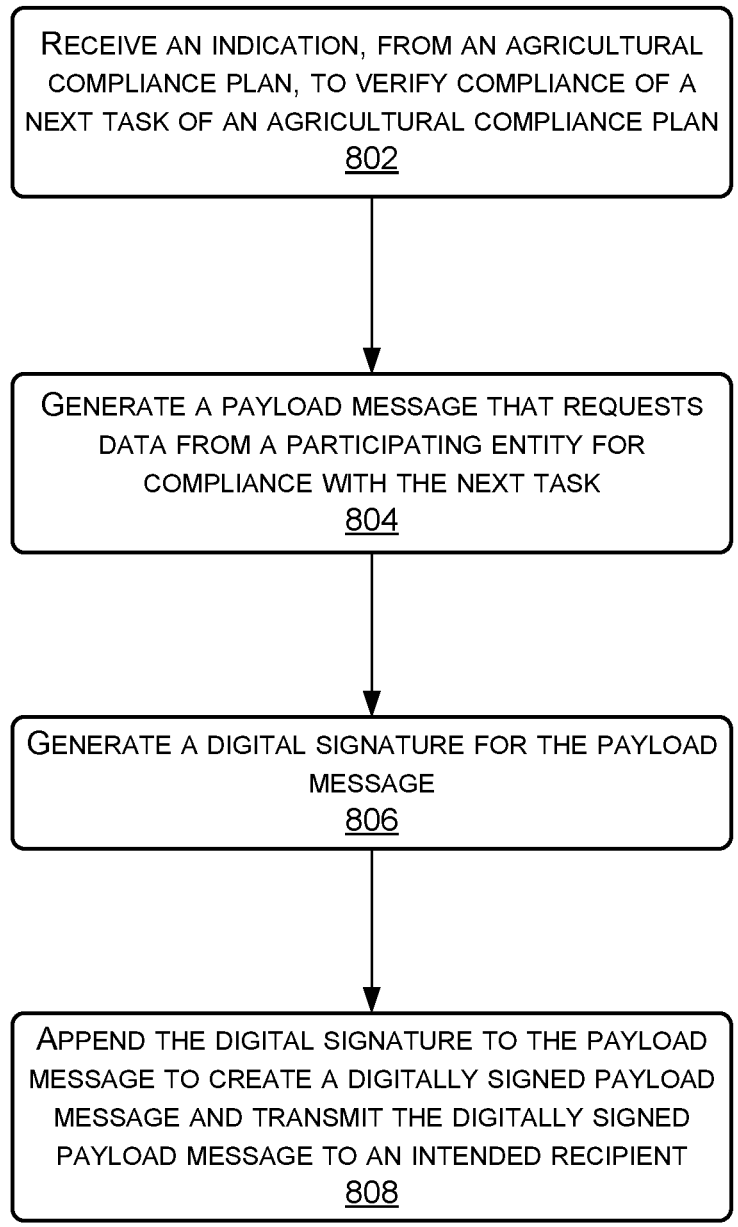
FIG. 8 illustrates a process for generating a digitally signed payload message that is associated with the compliance of an agricultural safety requirement.

FIG. 8 illustrates a process for generating a digitally signed payload message that is associated with the compliance of an agricultural safety requirement. The payload message may include data sent by a complying entity that is intended for a participating entity. For example, a grower's facility (i.e. complying entity) may generate a payload message that is intended for a distributor (i.e. participating entity) to confirm a box or pallet size for agricultural products.

At 802, a complying entity may receive an indication, from an agricultural compliance plan, to verify compliance of a next task associated with an agricultural compliance plan. In some examples, the complying entity may also receive, from the C-GRC controller, an interaction-specific public encryption key (CP-PUB key) and a complying entity private encryption key (C-PRIV key). The complying entity may receive the IS-public key in the event that the C-GRC controller determines that the complying entity is to interact with a participating entity to show compliance with the next task.

At 804, the complying entity may generate a payload message that request data from a participating entity for compliance with the next task. The data request may relate to a visual inspection of an agricultural production area/facility for contaminates, damage, or cleanliness.

At 806, the complying entity may generate a digital signature for the payload message by generating a hash of the payload message using a digital signature algorithm (i.e. HMAC with SHA256, ECDSA, RSASSA-PSS, etc.) and further encrypting the hash using the C-PRIV key, the CP-PUB key, and a predetermined public key encryption algorithm. In various examples, the encryption algorithm may correspond to an RSA (Rivest, Shamir, and Adelman) key algorithm.

The purpose of the digital signature is two-fold. First, the hash of the payload message is performed to permit the recipient (i.e. participating entity) to verify that the payload message remains unchanged since being sent by the complying entity. Second, the encryption of the hash is intended to permit the participating entity to verify the origin of the payload message.

At 808, the complying entity may append the digital signature to the payload message to create a digitally signed payload message and further transmit the digitally signed payload message to the intended recipient (i.e. participating entity). Upon receipt, the intended recipient may decrypt the digital signature using the CP-PUB key, a participating entity private encryption key (P-PRIV key) sourced from the C-GRC controller, and the predetermined public key encryption algorithm. The participating entity may generate a hash of the payload message and compare the generated hash with the hash of the payload message from the unencrypted digital signature. A match between the generated hash and the hash from the unencrypted digital signature verifies the content of the payload message. Further, the successful decryption of the digital signature to retrieve the hash verifies the origin of the digitally signed payload message.

Figure 9:
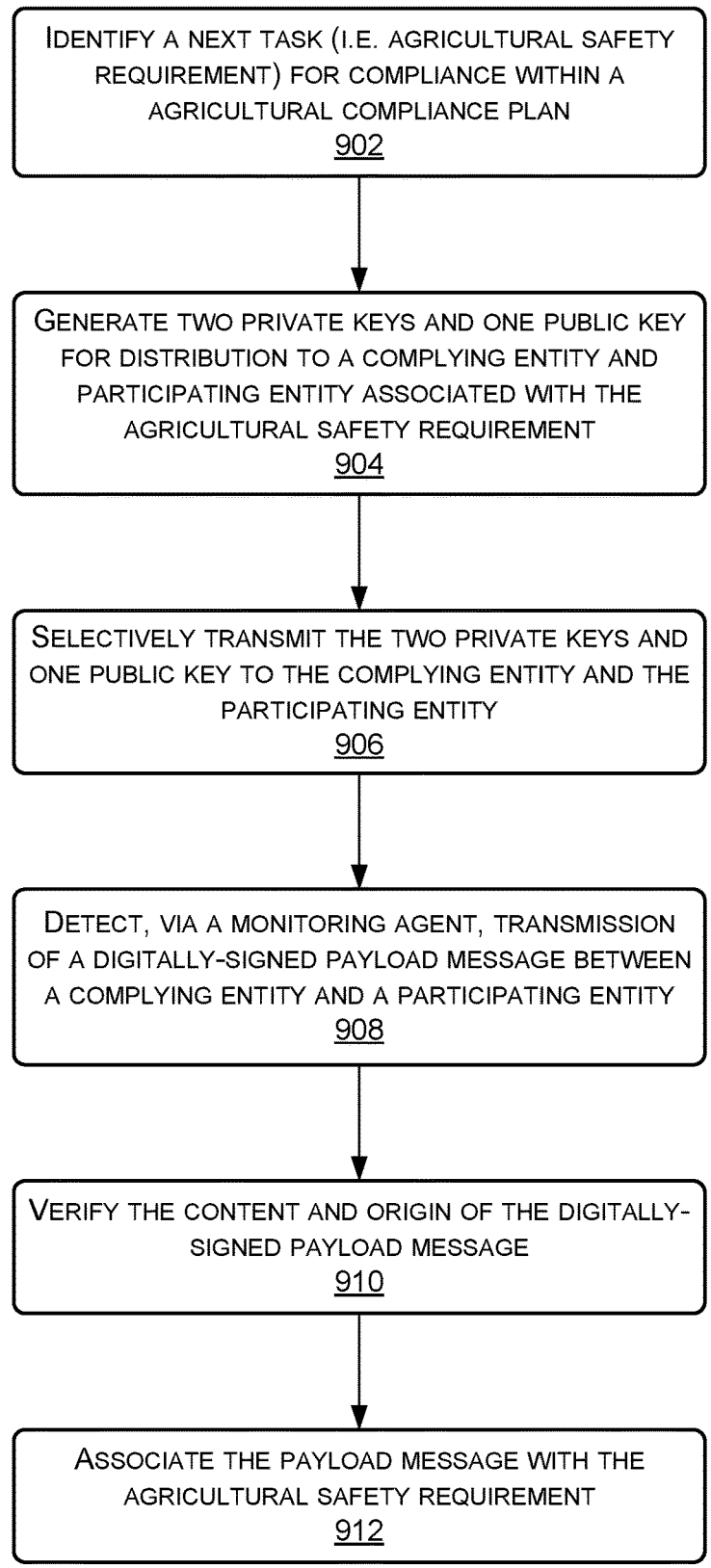
FIG. 9 illustrates a process for associating a payload message between a complying entity and a participating entity with an agricultural safety requirement (i.e. task) of an agricultural compliance plan.

FIG. 9 illustrates a process for associating a payload message between a complying entity and a participating entity with an agricultural safety requirement (i.e. task) of an agricultural compliance plan. In various examples, the C-GRC controller may use interaction-specific (IS)-public keys to associate each communication between complying and participating entities with a corresponding agricultural safety requirement (i.e. task).

At 902, the C-GRC controller may identify a next task (i.e. agricultural safety requirement) for compliance within an agricultural compliance plan that includes the interaction between a complying entity and a participating entity. The process of identifying the next task and whether an interaction between a complying entity and a participating entity is necessary is discussed in more detail with reference to process 700.

At 904, the C-GRC controller may generate two private encryption keys and one public key that may be used to generate and decrypt a digitally signed payload message sent between a complying entity and a participating entity. The two private encryption keys may include a first private encryption key for the complying entity and a second private encryption key for the participating entity. The public key may be shared between the complying entity and participating entity and correspond to an interaction-specific (IS)-public key.

In some examples, IS-public key may be used to track payload messages associated with particular agricultural safety requirements of an agricultural compliance plan. For example, the C-GRC controller may generate a task-key data record that correlates agricultural safety requirements with individual IS-public keys. In one example, individual agricultural safety requirements may be associated with an individual IS-public key. Alternatively, or additionally, each payload message associated with an individual agricultural safety requirement (i.e. the interaction between a complying entity and a participating entity, or interaction between a complying entity and the C-GRC controller) may be associated with an individual IS-public key. In this way, the C-GRC controller may track payload messages associated with particular agricultural safety requirements based on the IS-public keys used to encrypt the digital signature of a digitally signed payload message.

At 906, the C-GRC controller may transmit the first private encryption key and the IS-public key to the complying entity, and the second private encryption key and the IS-public key to the participating entity. The first private encryption key and IS-public key may be used in combination with a public key encryption algorithm to encrypt a payload message, and the second private encryption key and the IS-public key may be used in combination with the same public key encryption algorithm to decrypt the encrypted payload message. Use of a public key encryption algorithm means that the participating entity that receives the second private encryption key has no need to know the first private encryption key in order to decrypt the encrypted payload message, which is encrypted using the first private encryption key.

At 908, the C-GRC controller may detect transmission of a digitally signed payload message between a complying entity to a participating entity. The C-GRC controller may detect transmission of a digitally signed payload message via a monitoring agent native at an entity governance controller of the complying entity or the participating entity. The monitoring agent may monitor and detect the creation, transmission, and/or receipt of digitally signed payload messages at a complying entity or a participating entity.

At 910, the C-GRC controller may verify the content and origin of the digitally signed payload message using a combination of one of the first private encryption key or the second private encryption key, the IS-public key, and the public key encryption algorithm.

In some examples, the C-GRC controller may identify the complying or participating entity based on an identifier associated with the monitoring agent that detects the digitally signed payload message. Since the C-GRC controller generates an IS-public key for each specific interaction associated with an agricultural safety requirement, or each specific agricultural safety requirement, the C-GRC controller may include a plurality of IS-public keys that correspond to each of the complying or participating entities. Therefore, the C-GRC controller may iterate through its repository of IS-public keys associated with the complying and/or participating entity (i.e. the repository being based on the monitoring agent that detected the digitally signed payload message), until the use of a particular IS-public key correctly decrypts the digital signature of the digitally signed payload message.

At 912, the C-GRC controller may associate the payload message with the agricultural safety requirement of the agricultural compliance plan (from step 902) based at least in part on the IS-public key used to decrypt the digital signature of the digitally signed payload message. By virtue of identifying the IS-public key that correctly decrypts the digital signature of the digitally signed payload message, the C-GRC controller may use the task-key data record to associate the payload message with the correct agricultural safety requirement.

Figure 10:
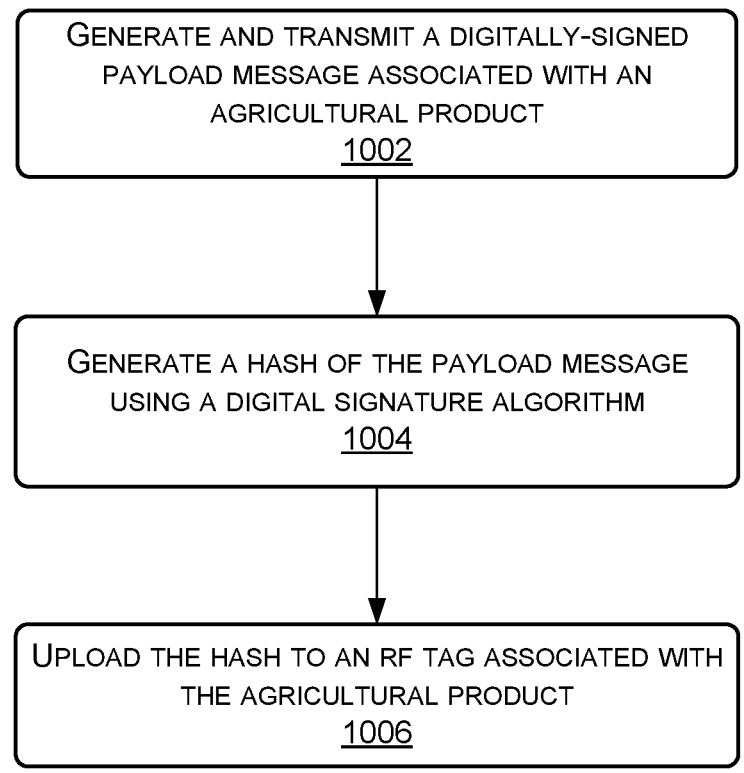
FIG. 10 illustrates a process for generating a hash of a payload message that is to be associated with physical specimens of plant-based product.

FIG. 10 illustrates a process for generating a hash of a payload message that is to be associated with physical specimens of agricultural product. The hash of the payload message may be stored within a Radio Frequency tag, a Quick Response (QR) code, or any other machine-readable code that is physically tied to an agricultural product.

At 1002, a first entity may generate a payload message associated with an agricultural product to a second entity. The first entity may correspond to a complying entity of an agricultural safety requirement, such as a grower, and the payload message may be intended for a participating entity, such as a retail outlet. In this example, the payload message may relate to agricultural products that are being physically transported from the first entity (i.e. grower) to the second entity (i.e. retail outlet).

The first entity (i.e. grower) may create a digitally signed payload message via process 800 of this disclosure, and in doing so, transmit the digitally signed payload message to the second entity (i.e. retail outlet).

At 1004, the first entity may generate a hash of the payload message using the same digital signature algorithm used for the digitally signed payload message. The digital signature algorithm may correspond to HMAC with SHA256, ECDSA, or RSASSA-PSS.

At 1006, the first entity may upload the hash to one or more RF tags, or QR codes, associated with the agricultural products. The purpose of doing so is to generate an association between the physical agricultural products sent to the participating entity and the digitally signed payload message also sent to the participating entity. In other words, in response to receiving a digitally signed payload message and agricultural products, a participating entity can compare the hash stored within the digital signature of the digitally signed payload message and the hash stored within the RF tag of the agricultural products. A match verifies an association between the digitally signed payload message and the agricultural products.

Having verified an association between the digitally signed payload message and agricultural products and having further verified the content and origin of the digitally signed payload message (process 800), the participating entity may retrieve verified information relating to the agricultural product, in its human-readable form, from the digitally signed payload message.

Figure 11:
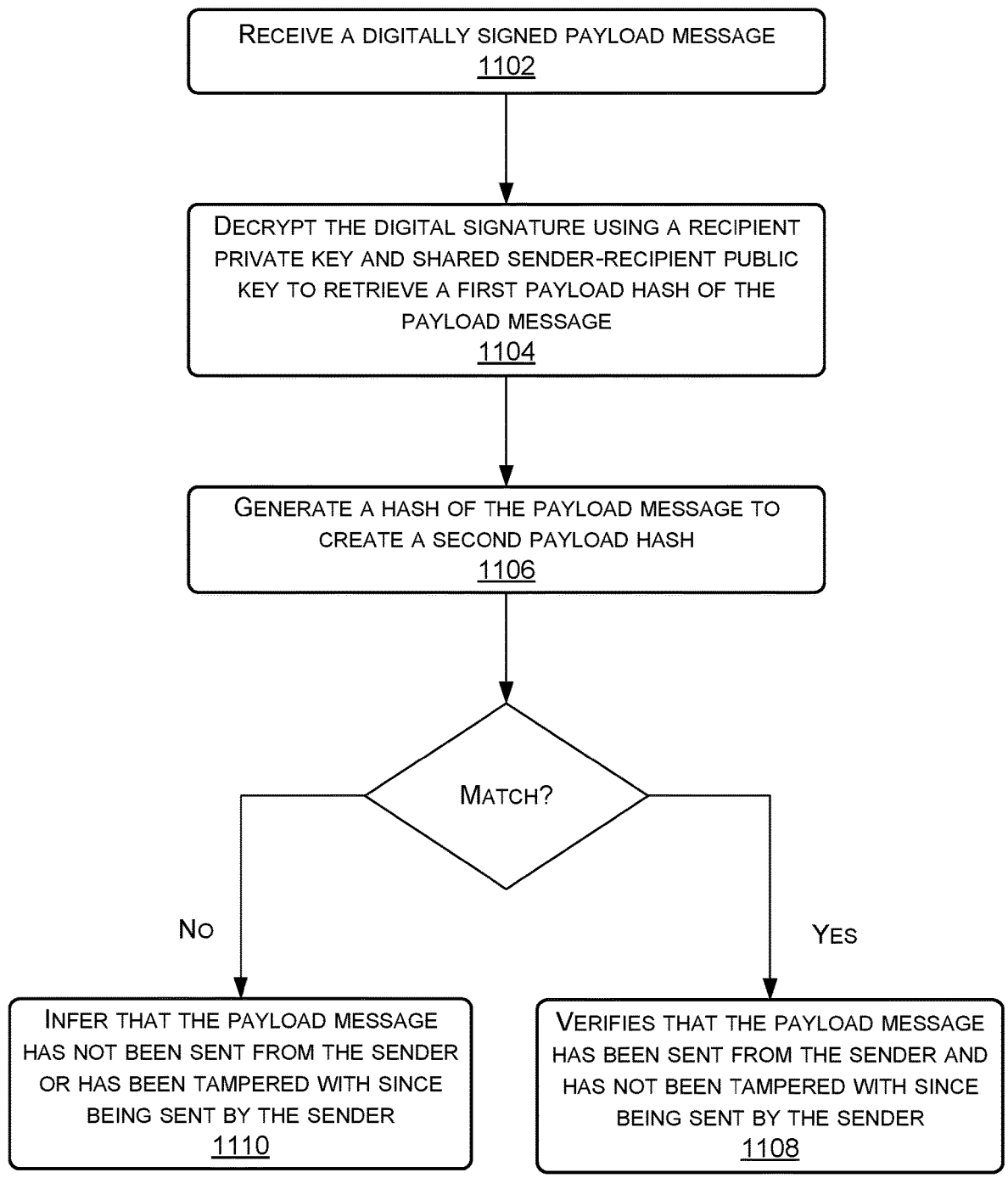
FIG. 11 illustrates a process for verifying the content and origin of a digitally signed payload message received at a recipient governance controller.

FIG. 11 illustrates a process for verifying the content and origin of a digitally signed payload message received at a recipient governance controller. The digitally signed payload message may include a payload message with an appended digital signature. A complying entity may generate the payload message to show compliance with an agricultural safety requirement of an agricultural compliance plan. In one example, the digitally signed payload message may be intended for the C-GRC controller or a participating entity (i.e. recipient) with whom the complying entity may interact.

At 1102, a recipient governance controller (i.e. participating entity) may receive a digitally signed payload message. The digitally signed payload message may comprise a payload message with an appended digital signature. The digital signature may include a hash of the payload message that is encrypted using a public key encryption algorithm, an entity-specific private encryption key and an interaction-specific (IS) public key, as discussed earlier with reference to process 800.

In some examples, the recipient governance controller may receive, independent of the digitally signed payload message, a recipient-specific private encryption key and an interaction-specific (IS)-public key. The recipient-specific private encryption key may have been shared by the C-GRC controller with the recipient governance controller at an earlier point in time. It is noteworthy that the recipient-specific private encryption key is different from the entity-specific private encryption key used to encrypt the digital signature, as described earlier with reference to process 800.

Further, the IS-public key may have been shared by the C-GRC controller with the recipient governance controller in the event that compliance with an agricultural safety requirement necessitates interaction between a complying entity and the participating entity.

At 1104, the recipient governance controller may decrypt the digital signature using the recipient-specific private encryption key, the IS public key and a public key encryption algorithm. In doing so, the recipient governance controller may retrieve a hash of the payload message from the unencrypted digital signature.

At 1106, the recipient governance controller may generate a hash of the payload message and compare the generated hash with the hash retrieved from the unencrypted digital signature.

At 1108, the recipient governance controller may determine that the generated hash matches the hash retrieved from the unencrypted digital signature. The match between hashes verifies that the content of the payload message has remained unchanged since being sent to the recipient governance controller. Further, the successful decryption of the digital signature to retrieve the hash further verifies the origin of the digitally signed payload message.

At 1110, the recipient governance controller may determine that the generated hash from the payload message does not match the hash retrieved from the unencrypted digital signature. In this instance, the recipient governance controller may infer that the payload message has been modified or tampered with since being sent.

Figure 12:
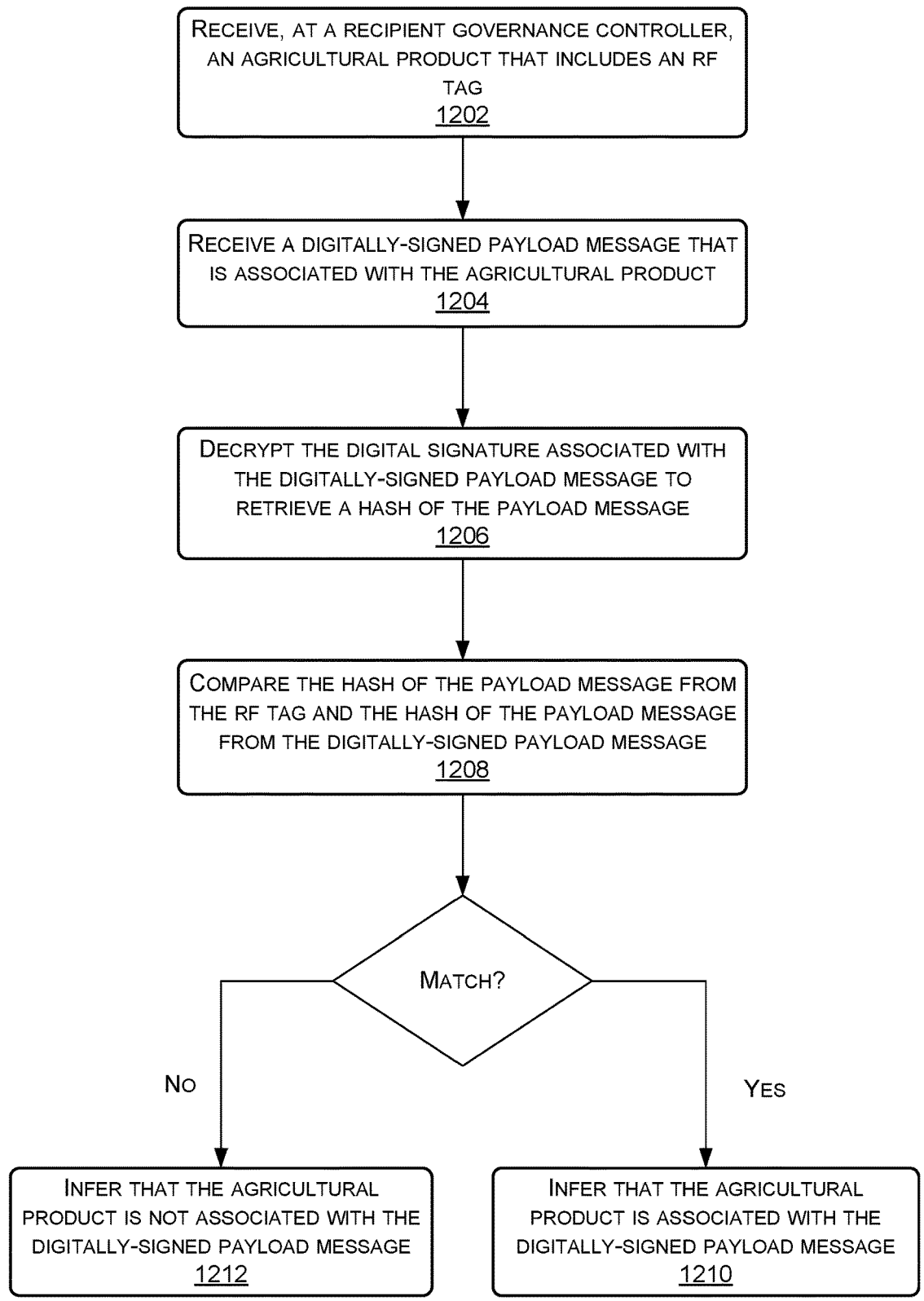
FIG. 12 illustrates a process for verifying the authenticity of a plant-based product via a stored payload message hash within a Radio Frequency (RF) tag.

FIG. 12 illustrates a process for verifying the authenticity of an agricultural product via a stored payload message hash within a Radio Frequency (RF) tag. In some examples, an agricultural product may be shipped between facilities as part of an ongoing process of developing a harvested crop for retail sale. Process 1200 provides a mechanism for verifying whether an agricultural product delivered to a recipient facility is received in the same condition it left the sending facility. In other words, process 1200 acts to verify that an agricultural product received at a recipient facility has not been tampered with, or replaced, during shipment from a sending facility.

At 1202, a recipient facility may receive an agricultural product that includes an RF tag that stores a payload message hash. In an alternative embodiment, a QR code may be used to store the payload message hash.

At 1204, the recipient facility, via a recipient governance controller, may retrieve a hash from the RF tag. In one embodiment, an RF tag reader may be used to retrieve the hash. In another embodiment, a QR code reader may be used to retrieve the hash from a QR code that is adopted in lieu of an RF tag.

At 1206, the recipient governance controller may receive a digitally signed payload message that is associated with the agricultural product. In some examples, the digitally signed payload message may be received at the same time, or substantially the same time, as the agricultural product.

At 1206, the recipient governance controller may decrypt the digital signature of the digitally signed payload message to retrieve a hash of the payload message via process 1100. In doing so, the recipient governance controller may also verify the content (i.e. matching hash) and origin (i.e. successful decryption of digital signature that includes the hash) of the digitally signed payload message.

At 1208, the recipient governance controller may compare the hash retrieved from the RF tag with the hash of the message payload retrieved from the digital signature. Alternatively, the recipient governance controller may generate a hash of the payload message associated with the digitally signed payload message and compare the generated hash with the hash of the payload message from At 1210, the recipient governance controller may determine that the hash from the RF tag matches the hash of the payload message from the digitally signed payload message. The match verifies that the agricultural product is associated with the digitally signed payload message. In other words, the origin of the agricultural product is the same as the digitally signed payload message. In some examples, the payload message itself may describe physical characteristics of the agricultural product, such as weight, number of plants, overall dimensions, plant identifiers, etc. when it was sent from its origin to the recipient facility. Thus, by verifying that the agricultural product is associated with the digitally signed payload message, the recipient governance controller may further determine whether the agricultural product has been physically tampered with during shipment, based on any change in weight, number of plants, overall dimensions, or plant identifiers.

At 1212, the recipient governance controller may determine that the hash from the RF tag does not match the hash of payload message from the digitally signed payload message. In this instance, the recipient governance controller may infer that the agricultural product is not associated with the digitally signed payload message.

CONCLUSION

Although the subject matter has been described in language specific to features and methodological acts, it is to be understood that the subject matter defined in the appended claims is not necessarily limited to the specific features or acts described herein. Rather, the specific features and acts are disclosed as exemplary forms of implementing the claims.

What is claimed:

1. A computer-implemented method, comprising:
under control of one or more processors:
identifying a complying entity that is associated with a showing of compliance of a pending task associated with an agricultural compliance plan;
updating, via a monitoring agent at a governance controller associated with the complying entity, the agricultural compliance plan to identify the pending task;
detecting, via the monitoring agent at the governance controller, an update associated with the pending task of the agricultural compliance plan;
capturing, via the monitoring agent, compliance data associated with an update of the agricultural compliance plan;
determining whether the complying entity has complied with the pending task; and
updating a record of the pending task in the agricultural compliance plan to include the compliance data and an indication associated with complying with the pending task.

2. The computer-implemented method of claim 1, wherein the compliance data corresponds to a visual inspection record by an authorized personnel of a facility associated with an agricultural operation of the complying entity, the facility corresponding to at least one of a greenhouse, a supplier, a warehouse, or a shipping vehicle.

3. The computer-implemented method of claim 1, wherein the compliance data corresponds to a record of environmental conditions captured by sensors as a facility associated with an agricultural operation, the record of environmental conditions including at least one of temperature, moisture, or ambient light intensity.

4. The computer-implemented method of claim 1, further comprising:
analyzing the compliance data associated with the update of the agricultural compliance plan;
determining that the complying entity has shown compliance with the pending task, based at least in part on an analysis of the compliance data associated with the update of the agricultural compliance plan; and
dynamically updating the agricultural compliance plan to create an updated agricultural compliance plan, the updated agricultural compliance plan to indicate the showing of compliance of the pending task and to identify a next pending task.

5. The computer-implemented method of claim 1, further comprising:
transmitting, to the monitoring agent, computer-executable instructions that cause the monitoring agent to replace the agricultural compliance plan within a data store of the governance controller with an updated agricultural compliance plan.

6. The computer-implemented method of claim 1, further comprising:
determining that the complying entity is to interact with a participating entity to gather data associated with the showing of compliance of the pending task;
transmitting, to the complying entity, a first private encryption key, a public encryption key, and an identifier of a predetermined public key encryption algorithm for communicating digitally signed payload messages with the participating entity, the public encryption key being valid for interactions between the complying entity and the participating entity that are associated with the showing of compliance of the pending task; and
transmitting, to the participating entity, a second private encryption key, the public encryption key, and the predetermined public key encryption algorithm for communicating digitally signed payload messages with the complying entity.

7. The computer-implemented method of claim 6, further comprising:
detecting, via the monitoring agent, that a digitally signed payload message has been sent between the complying entity and the participating entity;
retrieving, from the governance controller, the digitally signed payload message;
verifying an authenticity of the digitally signed payload message using one of the first private encryption key or the second private encryption key, the public encryption key, and the predetermined public key encryption algorithm; and
in response to verifying the authenticity of the digitally signed payload message, dynamically updating the agricultural compliance plan to include content of the digitally signed payload message.

8. The computer-implemented method of claim 1, further comprising:
detecting, via the monitoring agent, that the complying entity has retracted a compliance of a preceding task relative to the pending task;
updating the agricultural compliance plan to create an updated agricultural compliance plan, the updated agricultural compliance plan being configured to retract the compliance of the preceding task and one or more additional tasks that depend on the compliance of the preceding task, and to identify the preceding task as a next pending task; and
transmitting to the monitoring agent, computer-executable instructions that cause the monitoring agent to replace the agricultural compliance plan within a data store of the governance controller with the updated agricultural compliance plan.

9. One or more non-transitory computer-readable media storing computer-executable instructions that, when executed on one or more processors, cause the one or more processors to perform acts comprising:
receiving, at a governance controller, an update to an agricultural compliance plan that identifies a pending task;
initiating, via the governance controller, an interaction with a participating entity to gather data associated with compliance of the pending task;
in response to initiating the interaction with the participating entity, receiving, from a governance regulatory compliance (C-GRC) controller, a private encryption key, a public encryption key and a predetermined public key encryption algorithm for communicating digitally signed payload messages with the participating entity;

generating a first digitally signed payload message for delivery to the participating entity;

receiving, from the participating entity, a second digitally signed payload message that includes the data associated with compliance of the pending task;

updating the agricultural compliance plan to include compliance data that is based at least in part the second digitally signed payload message; and receiving, from the C-GRC controller, an updated agricultural compliance plan, based at least in part on the compliance data.

10. The one or more non-transitory computer-readable media of claim 9, wherein the public encryption key is valid for interactions with the participating entity that are associated with a showing of one instance of compliance of the pending task.

11. The one or more non-transitory computer-readable media of claim 9, wherein generating the first digitally signed payload message further comprising:

generating a first payload message that includes a request for the data associated with compliance of the pending task;

generating a hash of the first payload message using a digital signature algorithm;

creating a digital signature by encrypting the hash using the private encryption key, the public encryption key, and the predetermined public key encryption algorithm; and appending the digital signature to the first payload message to generate the first digitally signed payload message.

12. The one or more non-transitory computer-readable media of claim 9, further comprising:

decrypting a second digital signature of the second digitally signed payload message to retrieve a digital signature hash using the private encryption key, the public encryption key, and the predetermined public key encryption algorithm;

generating a hash of a second payload message associated with the second digitally signed payload message to create a generated hash using a digital signature algorithm; and verifying an authenticity of the second digitally signed payload message based at least in part on a match between the digital signature hash and the generated hash.

13. The one or more non-transitory computer-readable media of claim 12, further comprising:

receiving, from the participating entity, one or more physical agricultural specimens that fitted with one of a Radio Frequency (RF) tag or a Quick Response (QR) code tag;

retrieving, from the RF tag or the QR code tag, a RF hash associated with the physical agricultural specimens; and determining an additional authenticity of the one or more physical agricultural specimens based at least in part on an additional match between the RF hash and one of the generated hash or the digital signature hash.

14. The one or more non-transitory computer-readable media of claim 9, further comprising:

determining that one or more physical agricultural specimens are to be delivered to the participating entity;

generating a hash of a first payload message associated with the first digitally signed payload message using a digital signature algorithm; and prior to a delivery of the one or more physical agricultural specimens, uploading the hash to individual Radio Frequency (RF) tags or Quick Response (QR) tags associated with the one or more physical agricultural specimens.

15. The one or more non-transitory computer-readable media of claim 9, further comprising:

retracting, via a dashboard of the governance controller, a compliance of a preceding task relative to the pending task; and receiving, from the C-GRC controller, an updated agricultural governance plan that replaces the agricultural compliance plan, the updated agricultural governance plan being configured to retract the compliance of the preceding task and one or more additional tasks that depend on the compliance of the preceding task, the updated agricultural governance plan further identifying the preceding task as a next pending task.

16. A system comprising:

one or more processors;

memory coupled to the one or more processors, the memory including one or more modules that are executable by the one or more processors to:

identify a complying entity that is associated with a showing of compliance of a pending task associated with an agricultural compliance plan;

transmit, to a monitoring agent of a governance controller associated with the complying entity, computer-executable instructions that identify the pending task on the agricultural compliance plan;

intercept, via the monitoring agent, one or more digitally signed payload messages communicated between the complying entity and a participating entity;

update the agricultural compliance plan to include a record of the one or more digitally signed payload messages between the complying entity and the participating entity;

detect, via the monitoring agent, an update associated with the pending task of the agricultural compliance plan; and update an additional record of the pending task in the agricultural compliance plan to include an indication of the update associated with the pending task.

17. The system of claim 16, wherein the one or more modules are further executable by the one or more processors to:

detect, via the monitoring agent, that the complying entity is interacting with the participating entity to gather data associated with the showing of compliance of the pending task;

transmit, to the complying entity, a first private encryption key, a public encryption key, and an identifier of a predetermined public key encryption algorithm for communicating the one or more digitally signed payload messages with the participating entity; and transmit, to the participating entity, a second private encryption key, the public encryption key, and the predetermined public key encryption algorithm for communicating the one or more digitally signed payload messages with the complying entity.

18. The system of claim 17, wherein the one or more modules are further executable by the one or more processors to:

verify an authenticity of the one or more digitally signed payload messages communicated between the complying entity and the participating entity, based at least in part on one of the first private encryption key or the second private encryption key, the public encryption key, and the predetermined public key encryption algorithm.

19. The system of claim 16, wherein the one or more modules are further executable by the one or more processors to:
capture, via the monitoring agent, compliance data associated with the update, the compliance data corresponding to a visual inspection record performed by an authorized person or an automated capture of environmental conditions via sensors at a facility associated with an agricultural operation of the complying entity, and
wherein, the update of the record of the pending task further includes the compliance data.

20. The system of claim 16, wherein the complying entity and the participating entity correspond to one of a grower, a supplier, a warehouse, an auditor, or a retailer that is associated with an agricultural operation governed by the agricultural compliance plan.

* * * * *